US008573596B2

(12) United States Patent
Gearty

(10) Patent No.: US 8,573,596 B2
(45) Date of Patent: Nov. 5, 2013

(54) COLOR BY SYMBOL PICTURE PUZZLE KIT

(75) Inventor: Anita Jane Gearty, Tinton Falls, NJ (US)

(73) Assignee: Kopykatkids LLC., Tinton Falls, NJ (US)

( * ) Notice: Subject to any disclaimer, the term of this patent is extended or adjusted under 35 U.S.C. 154(b) by 287 days.

(21) Appl. No.: 13/118,578

(22) Filed: May 31, 2011

(65) Prior Publication Data

US 2011/0227284 A1    Sep. 22, 2011

Related U.S. Application Data

(63) Continuation-in-part of application No. 12/535,670, filed on Aug. 4, 2009, now Pat. No. 8,191,895, which is a continuation-in-part of application No. 12/188,208, filed on Aug. 8, 2008, now abandoned.

(51) Int. Cl.
*A63F 9/10* (2006.01)

(52) U.S. Cl.
USPC ...................................... 273/157 R; 434/406

(58) Field of Classification Search
USPC ....... 273/157 R, 153 R, 157 A, 156; 434/406, 434/81, 84, 85, 98
See application file for complete search history.

(56) References Cited

U.S. PATENT DOCUMENTS

| | | | | |
|---|---|---|---|---|
| 1,480,458 A * | 1/1924 | Mershon | ........................ | 434/84 |
| 2,450,127 A * | 9/1948 | Gardener et al. | ................ | 434/84 |
| 2,954,615 A * | 10/1960 | Brown | ............................ | 434/84 |
| 3,010,723 A * | 11/1961 | Moss | ........................ | 273/157 R |
| 3,433,485 A * | 3/1969 | Renn et al. | ................. | 273/157 R |
| 3,558,136 A * | 1/1971 | McFarland | ................. | 273/282.1 |
| 3,909,003 A * | 9/1975 | Rabinovich | ................ | 273/157 R |
| 4,219,194 A * | 8/1980 | Powers | ...................... | 273/157 R |
| 4,799,680 A * | 1/1989 | Weimar | ..................... | 273/157 R |
| 4,828,497 A * | 5/1989 | Kurgan | ............................ | 434/96 |
| 4,893,817 A * | 1/1990 | Shilo | ........................ | 273/157 R |
| 5,090,701 A * | 2/1992 | Chang | ........................ | 273/157 R |
| 5,893,560 A * | 4/1999 | McClelland | .............. | 273/157 R |
| 6,213,465 B1 * | 4/2001 | Jacoby | ....................... | 273/157 R |
| 8,413,988 B2 * | 4/2013 | Gearty | ........................ | 273/157 R |
| 2003/0067114 A1* | 4/2003 | Morioka | ................... | 273/157 R |
| 2011/0031689 A1* | 2/2011 | Binder | ...................... | 273/157 R |

* cited by examiner

*Primary Examiner* — Steven Wong
(74) *Attorney, Agent, or Firm* — Ash Tankha; Lipton, Weinberger & Husick

(57) ABSTRACT

A picture puzzle kit is provided for coloring duplicate picture puzzles marked with distinct indicia corresponding to multiple colors. The picture puzzle kit comprises two or more sets of puzzle pieces comprising parts that define a picture puzzle. The puzzle pieces in one set are duplicates of corresponding puzzle pieces in another set. The puzzle pieces in one set are marked with indicia corresponding to a color, which are distinct from indicia marked on the puzzle pieces in another set. Opposing sides of the puzzle pieces can be marked with distinct indicia. Two or more color charts display colors corresponding to the distinct indicia marked on the puzzle pieces. Coloring tools are used to color the puzzle pieces based on the colors corresponding to the distinct indicia, displayed on the color charts. Corresponding colored puzzle pieces in the sets are interchanged for creating duplicate picture puzzles of different colors.

30 Claims, 26 Drawing Sheets

COLOR BY SYMBOL PICTURE PUZZLE KIT

CROSS REFERENCE TO RELATED APPLICATIONS

This is a continuation-in-part application of patent application Ser. No. 12/535,670 titled "Color By Symbol Picture Puzzle Kit" filed on Aug. 4, 2009 in the United States Patent and Trademark Office, now U.S. Pat. No. 8,413,988 which is a continuation-in-part application of non-provisional patent application Ser. No. 12/188,208, titled "Color By Symbol Picture Puzzle Kit" filed on Aug. 8, 2008 in the United States Patent and Trademark Office, now abandoned.

The specifications of the above referenced patent applications are incorporated herein by reference in their entirety.

BACKGROUND

The picture puzzle kit disclosed herein, in general, relates to coloring puzzles. More particularly, the picture puzzle kit disclosed herein relates to coloring picture puzzles marked with distinct indicia corresponding to different colors.

A puzzle is a game that requires ingenuity and persistence in assembling or solving. Puzzles are often devised as a form of entertainment. Puzzles may be divided into different categories, for example, jigsaw puzzles, picture puzzles, transport puzzles, word puzzles, sliding puzzles, logic puzzles, folding puzzles, etc. Typically, puzzles only provide a user with a means of assembling puzzle pieces together. There is a need for puzzles that allow a user to color a puzzle piece by associating an indicia of a color marked on the puzzle piece with the color shown in a color chart. Furthermore, typical puzzles do not provide a means to color the same puzzle in different colors with different coloring schemes and to create duplicate picture puzzles of different colors.

Hence, there is a long felt but unresolved need for a picture puzzle kit that is educational in nature, entertains a user, and allows the user to color a picture puzzle and duplicate picture puzzles marked with distinct indicia corresponding to different colors by associating the distinct indicia marked on the puzzle pieces with the colors displayed in one or more color charts.

BRIEF DESCRIPTION OF THE DRAWINGS

The following detailed description of the invention is better understood when read in conjunction with the appended drawings. For the purpose of illustrating the invention, exemplary constructions of the invention are shown in the drawings. However, the invention is not limited to the specific methods and instrumentalities disclosed herein.

DETAILED DESCRIPTION OF THE INVENTION

Figure 1:
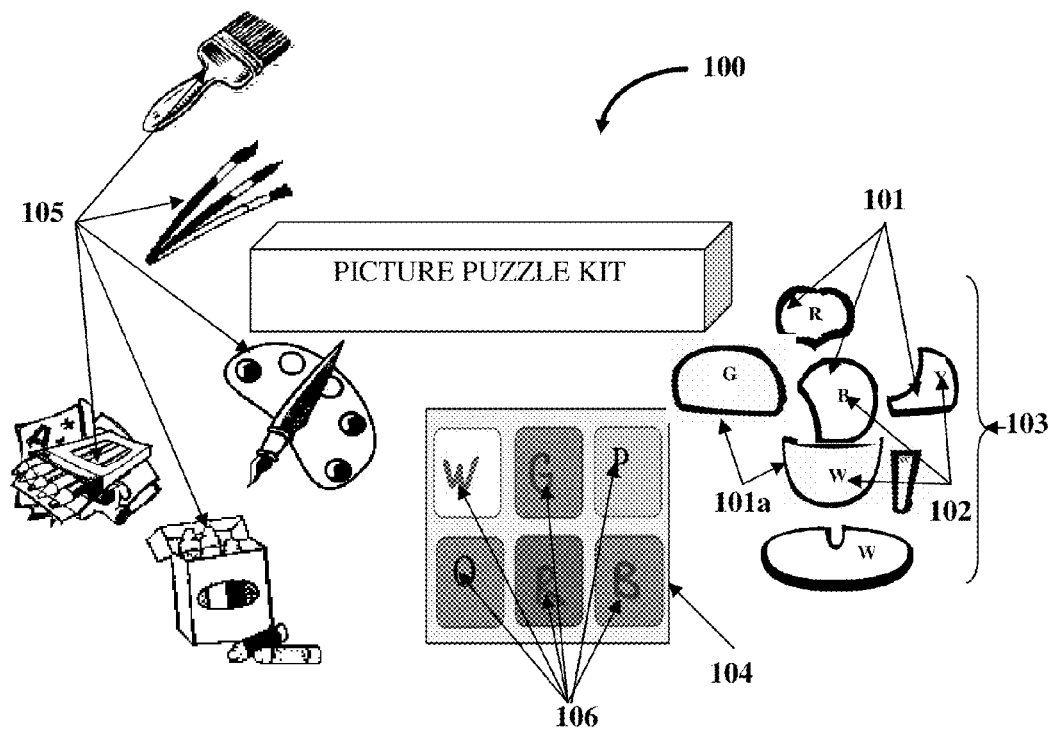
FIG. 1 exemplarily illustrates a picture puzzle kit that enables a user to color a picture puzzle marked with indicia corresponding to multiple colors.

FIG. 1 exemplarily illustrates a picture puzzle kit 100 that enables a user to color a picture puzzle 103 marked with indicia 102, for example, W, G, B, R, etc., corresponding to multiple colors. As used herein, the term "indicia" refers to markings in the form of, for example, alphabets, numerals, symbols, shapes, etc., that correspond to colors used for coloring puzzle pieces 101. The picture puzzle kit 100 disclosed herein comprises multiple puzzle pieces 101, a color chart 104, and coloring tools 105. Each of the puzzle pieces 101 has a length, a width, and a thickness. The thickness is small compared to the length and the width. Each of the puzzle pieces 101 defines an outside edge 101a. The outside edge 101a of each of the puzzle pieces 101 is configured to mate with an outside edge 101a of at least one or two other puzzle pieces 101. The puzzle pieces 101 comprise parts of a picture.

Figure 2A:
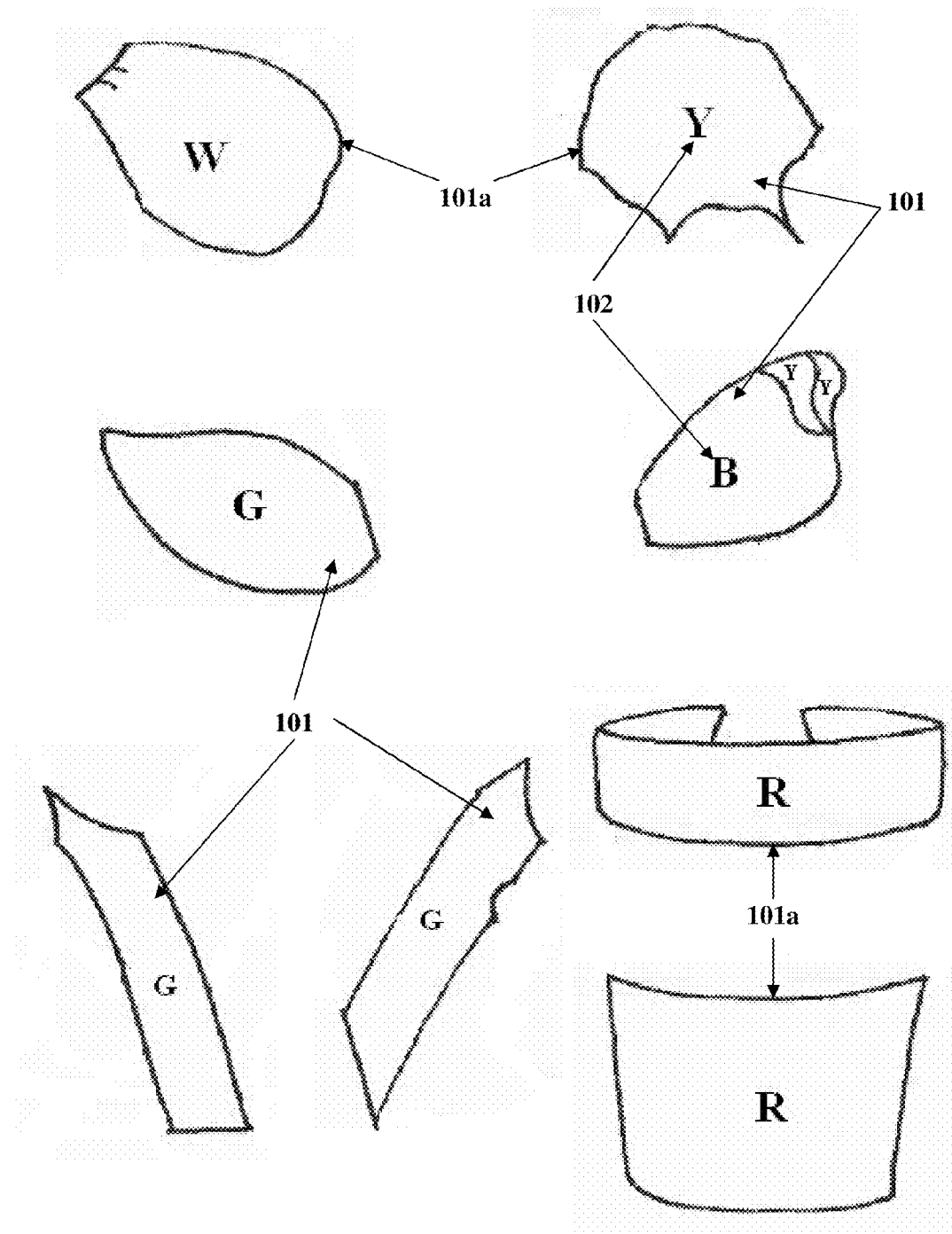
FIG. 2A exemplarily illustrates puzzle pieces comprising parts of a picture of a flower pot.

FIG. 2A exemplarily illustrates puzzle pieces 101 comprising parts of a picture of a flower pot. The puzzle pieces 101 are marked with and display indicia 102 or symbols that correspond to different colors. The indicia 102 displayed on the puzzle pieces 101 are marked, for example, by stamping, engraving, imprinting, impressing, etc. The indicia 102 are, for example, in the form of alphabets corresponding to different colors as exemplarily illustrated in FIG. 1, FIGS. 2A-2B, FIGS. 4A-4B, and FIGS. 6A-6B. For example, in FIG. 2A, the puzzle pieces 101 are marked with the indicia 102 W, G, Y, R, and B corresponding to the colors white, green, yellow, red, and blue respectively. The puzzle pieces 101 are, for example, made of plastic, card board, or a wooden material. The wooden material is, for example, a wood composite, a pressed wood, a solid wood, etc. In an embodiment, the picture puzzle kit 100 exemplarily illustrated in FIG. 1 further comprises a puzzle base 905, as exemplarily illustrated in FIG. 9, for supporting the puzzle pieces 101.

Figure 2B:
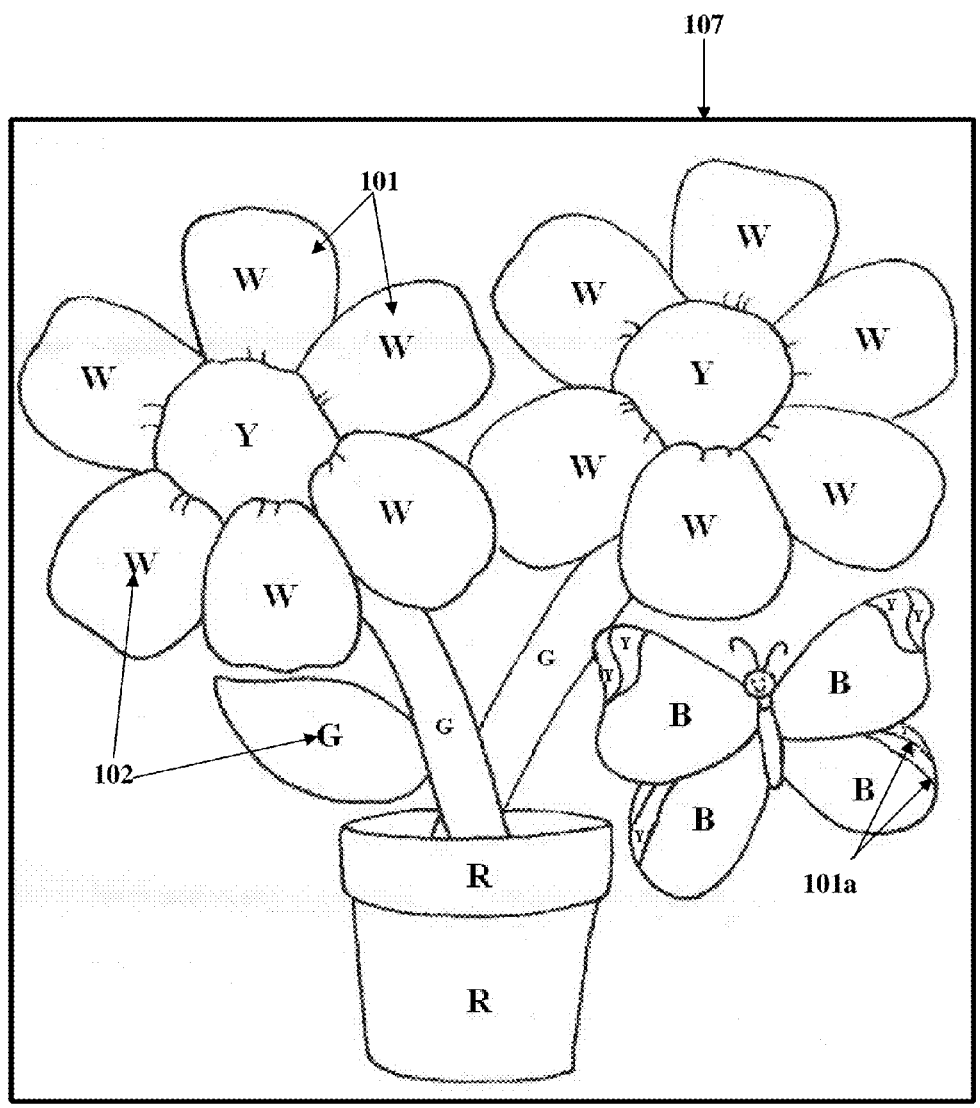
FIG. 2B exemplarily illustrates puzzle pieces marked with indicia representing different colors, placed adjacent to one another to assemble the flower pot picture puzzle.

FIG. 2B exemplarily illustrates puzzle pieces 101 marked with indicia 102 representing different colors, placed adjacent to one another to assemble the flower pot picture puzzle 107. The picture puzzle 107, exemplarily illustrated in FIG. 2B, is assembled by linking the puzzle pieces 101. The picture puzzle 107 is of different designs. In an embodiment, a picture puzzle that can be assembled by linking puzzle pieces is defined as a page of a puzzle book (not shown), where each page of the puzzle book tells a portion of a story and can be colored with colors corresponding to colors displayed on the color chart 104 exemplarily illustrated in FIG. 1. The puzzle pieces 101 are linked by placing the puzzle pieces 101 adjacent to one another as exemplarily illustrated in FIG. 2B and FIG. 4B or by interlocking the adjacent puzzle pieces 101 as exemplarily illustrated in FIG. 6B. The puzzle pieces 101 together define the picture puzzle 107 when the outside edge 101a of each of the puzzle pieces 101 are mated one to another and the puzzle pieces 101 are colored with colors corresponding to the colors associated by the color chart 104 with the indicia 102 marked on the puzzle pieces 101 using the coloring tools 105 exemplarily illustrated in FIG. 1. In an embodiment, the puzzle pieces are also shaped as jigsaw puzzle pieces 601 as exemplarily illustrated in FIG. 6A, where the jigsaw puzzle pieces 601 are linked by interlocking as exemplarily illustrated in FIG. 6B.

In an embodiment, multiple removable layers (not shown) are stacked one above the other on each of the puzzle pieces 101. The removable layers are, for example, peel-off self adhesive sheets of flexible plastic or scratch-off layers. Each of the removable layers is removed to reveal another one of the removable layers below the removed layer. The removable layers are marked with different indicia 102; therefore each one of the revealed removable layers presents a different coloring possibility on the puzzle pieces 101. In an embodiment, each of the removable layers is transparent and is marked with the indicia 102 corresponding to one of the different colors. When transparent removable layers are used, the removable layers below the removed upper layers are partially visible due to the transparence. Coloring tools 105 of translucent colors are provided for coloring on the transparent removable layers. A user may color on one layer, or may remove the first layer and then color on the next layer. Also, when the colored layers are placed one above the other on the puzzle pieces 101, the colored layers in combination form new colors. In another embodiment, the layers affixed to the puzzle pieces 101 are not transparent.

Consider an example where a transparent removable top layer and a transparent removable bottom layer are stacked one above the other on an upper surface of a puzzle piece 101. The top layer is marked with an indicia, for example, B. The bottom layer is marked with an indicia, for example, Y. The user first colors the top layer blue in accordance with the color chart 104 for the indicia B on the puzzle piece 101 using the coloring tools 105 provided in the picture puzzle kit 100 exemplarily illustrated in FIG. 1. The user then removes the top layer to expose the bottom layer. On seeing the indicia Y marked on the bottom layer, the user determines that Y represents the color yellow using the color chart 104. The user then colors the bottom layer yellow using the coloring tools 105 provided in the picture puzzle kit 100. The user can then reattach the blue colored top layer over the yellow colored bottom layer on the puzzle piece 101 to yield a green color for the puzzle piece 101.

Figure 7:
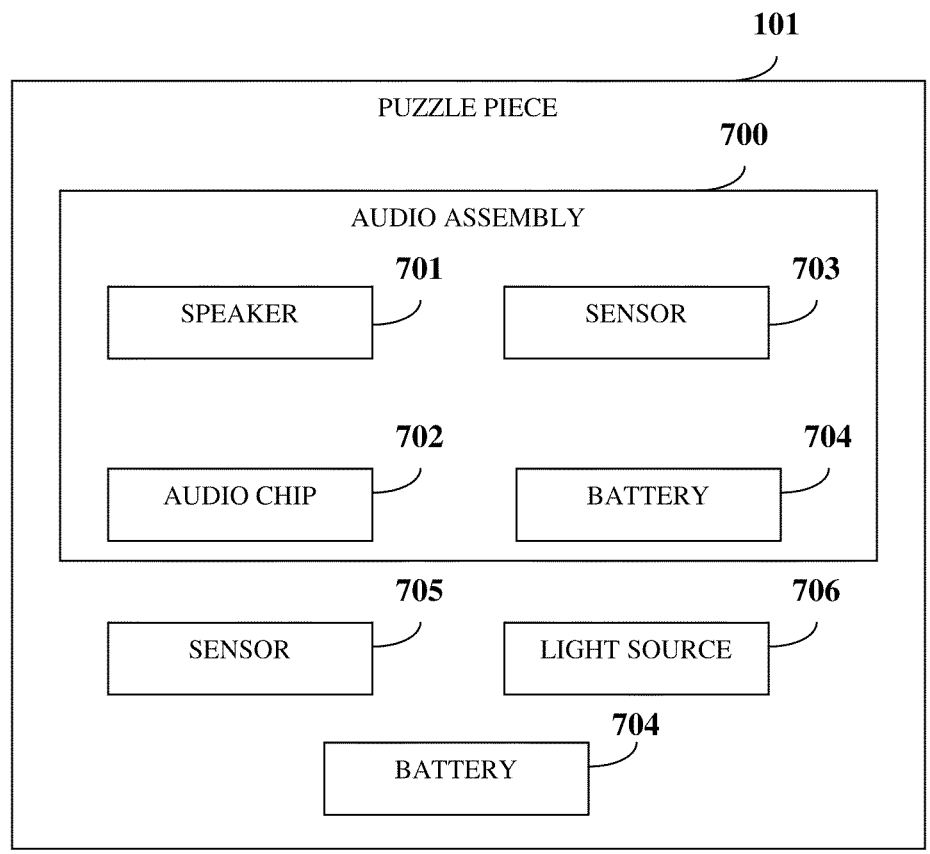
FIG. 7 exemplarily illustrates a block diagram of a puzzle piece embedded with an audio assembly for audibly indicating one or more characteristics of the puzzle piece.

In an embodiment, a battery 704 operated light source 706, for example, a light emitting diode (LED), as exemplarily illustrated in FIG. 7, is embedded in the puzzle piece 101 to illuminate the colored transparent removable layers stacked on the puzzle piece 101. The yellow colored bottom layer and the blue colored top layer on the puzzle piece 101 in combination will therefore appear as an illuminated green colored puzzle piece 101.

In another embodiment, a rub off removable layer (not shown) is provided on each of the puzzle pieces 101. The rubbed off removable layer reveals the indicia 102 corresponding to one of the colors for the puzzle piece 101, when rubbed off.

In another embodiment, each of the puzzle pieces 101 comprises an embedded audio assembly 700 for audibly indicating a single or a combination of characteristics, for example, color, name, etc., of each of the puzzle pieces 101 when pressure is applied on the puzzle pieces 101. FIG. 7 exemplarily illustrates a block diagram of a puzzle piece 101 embedded with an audio assembly 700 for audibly indicating one or more characteristics of the puzzle piece 101. In an embodiment, the audio assembly 700 is also embedded in the color chart 104 exemplarily illustrated in FIG. 1 and FIG. 3, for audibly indicating the colors and corresponding indicia 106 displayed on the color chart 104 as disclosed in the detailed description of FIG. 3. The embedded audio assembly 700 comprises a battery 704, an audio chip 702, and a speaker 701. The embedded audio assembly 700 further comprises a sensor 703 for sensing the applied pressure. As an example, when a user presses a puzzle piece 101 marked the indicia 102 G with a finger, the speaker 701 audibly announces the word "green". In another example, when the user presses a puzzle piece 101 shaped like a leaf, the speaker 701 announces the word "leaf". A combination of characteristics, for example, name along with the color, of each of the puzzle pieces 101 may also be announced when pressure is applied on each of the puzzle pieces 101. For example, when the user presses a puzzle piece 101 shaped like a leaf marked with the indicia 102 G, the speaker 701 announces a message "green leaf". The user can then color the puzzle piece 101 with a green color using the coloring tools 105 provided in the picture puzzle kit 100.

In an embodiment, the embedded audio assembly 700 audibly indicates the characteristics of the puzzle pieces 101 when the puzzle pieces 101 are pressed one or more times. The audio chip 702 in the embedded audio assembly 700 is programmed to count the number of times pressure is applied on each of the puzzle pieces 101 and sends an appropriate message signal to the speaker 701. For example, the embedded audio assembly 700 audibly indicates the color of a puzzle piece 101 when pressed one time and the name of the puzzle piece 101 when pressed a second time. The user can then color the puzzle piece 101 with the corresponding color using the coloring tools 105 provided in the picture puzzle kit 100.

In another embodiment, the embedded audio assembly 700 audibly annunciates a resultant color that is obtained when two or more colors are combined, when the puzzle pieces 101 marked with the indicia 102 corresponding to two or more colors are pressed sequentially or simultaneously. As an example, when the user presses a puzzle piece 101 marked with an indicia 102 B corresponding to the color blue and then presses a puzzle piece 101 marked with an indicia 102 Y corresponding to the color yellow, a message "green" is announced.

In another embodiment, the embedded audio assembly 700 audibly annunciates a mismatch when the puzzle pieces 101 are linked incorrectly. Each edge 101a of each of the puzzle pieces 101 comprises a sensor 705 for detecting a mismatch when the linking of the puzzle pieces 101 is incorrect. On detecting the mismatch, the sensor 705 sends a mismatch signal to the embedded audio assembly 700 in the puzzle pieces 101 for generating an audible mismatch message. For example, if a user places a leaf shaped puzzle piece 101 instead of a petal shaped puzzle piece 101 to create a picture of a flower, the embedded audio assembly 700 annunciates a message, for example, "Mismatch" or "Error". Similarly, if the edges 101a of the jigsaw puzzle pieces 601 as exemplarily illustrated in FIG. 6A, do not mate with each other in a correct sequence to complete a picture, a message, for example, "Mismatch" is announced. When all the individual puzzle pieces 101 mate with each other in the correct sequence, a message, for example, "Match" is announced.

In another embodiment, each of the puzzle pieces 101 are marked with two indicia 102, for example, B and Y corresponding to the color blue and the color yellow respectively. In another embodiment, multiple removable translucent layers (not shown) of different colors are stacked one above the other in the color chart 104 exemplarily illustrated in FIG. 1. When, for example, blue and yellow colored translucent layers from the color chart 104 are placed above each other on the puzzle pieces 101, the resultant color, which is green obtained by combining the color blue and the color yellow, appears on the puzzle piece 101 when illuminated from the light source 706 embedded in the puzzle piece 101.

Figure 3:
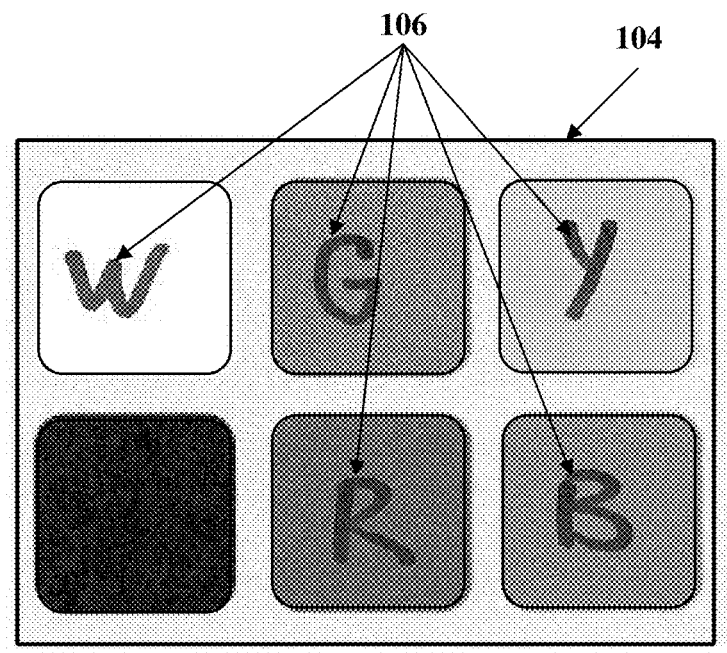
FIG. 3 exemplarily illustrates a color chart for the flower pot picture puzzle of FIG. 2B, displaying colors that correspond to the indicia marked on the puzzle pieces of the flower pot picture puzzle.

FIG. 3 exemplarily illustrates a color chart 104 for the flower pot picture puzzle 107 illustrated in FIG. 2B, displaying colors that correspond to the indicia 102 marked on the puzzle pieces 101 of the flower pot picture puzzle 107. The color chart 104 shows the colors with corresponding indicia 106 by superimposing the indicia 106 against a background of the colors. For example, indicia 106 of G would be superimposed against a green background in the color chart 104. The color chart 104 for the picture puzzle 107 of FIG. 2B displays indicia 106, for example, W, G, Y, R, and B against background colors white, green, yellow, red, and blue respectively. The color chart 104 is different for each picture puzzle kit 100 exemplarily illustrated in FIG. 1. A user associates the indicia 102 marked on the puzzle pieces 101 with the corresponding indicia 106 superimposed against a background of the colors in the color chart 104 to determine the colors to be used for coloring the puzzle pieces 101.

In an embodiment, the color chart 104 comprises an embedded audio assembly 700 as exemplarily illustrated in FIG. 7 for audibly indicating the colors and the corresponding indicia 106 displayed on the color chart 104 when pressure is applied on predefined areas of the color chart 104. For example, on pressing the indicia 106 B or a blue colored area in the color chart 104, the embedded audio assembly 700 annunciates the word "blue". In another example, when the user presses the indicia 106 G or a green colored area in the color chart 104, the embedded audio assembly 700 annunciates the message "G for green". The user can therefore infer that the indicia 106 G corresponds to the color green and may then color the puzzle piece 101 marked with the indicia 102 G with a green color using the coloring tools 105 provided in the picture puzzle kit 100 exemplarily illustrated in FIG. 1.

In another embodiment, the embedded audio assembly 700 as exemplarily illustrated in FIG. 7 audibly annunciates a resultant color that is obtained when two or more colors are combined, when two or more predefined areas of the color chart 104 are pressed sequentially or simultaneously. In an example, when the user presses the indicia 106 B or a blue colored area in the color chart 104 and then presses the indicia 106 Y or a yellow colored area in the color chart 104, the embedded audio assembly 700 annunciates the message "green". The user can therefore infer that the combination of the color blue and the color yellow produces the color green. The user may then mix the color blue with the color yellow using the coloring tools 105 provided in the picture puzzle kit 100 to produce a green color and may then color a puzzle piece 101 marked with the indicia 102 G with the produced green color using the coloring tools 105.

Figure 4A:
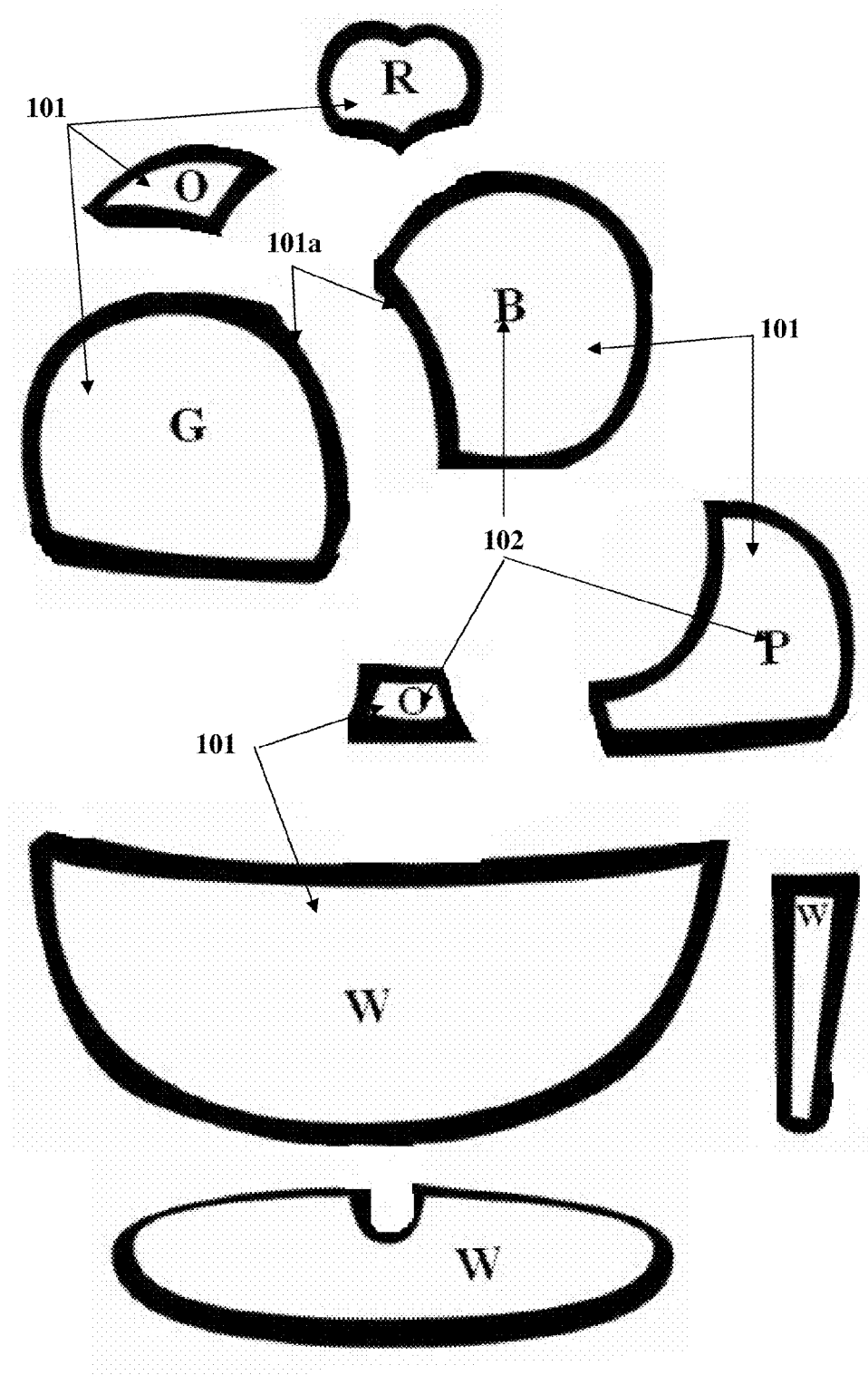
FIG. 4A exemplarily illustrates puzzle pieces comprising parts of a picture of an ice cream sundae.

FIG. 4A exemplarily illustrates puzzle pieces 101 comprising parts of a picture of an ice cream sundae. The puzzle pieces 101 are marked with the indicia 102 W, G, P, O, R, and B corresponding to the colors white, green, pink, orange, red, and blue respectively.

Figure 4B:
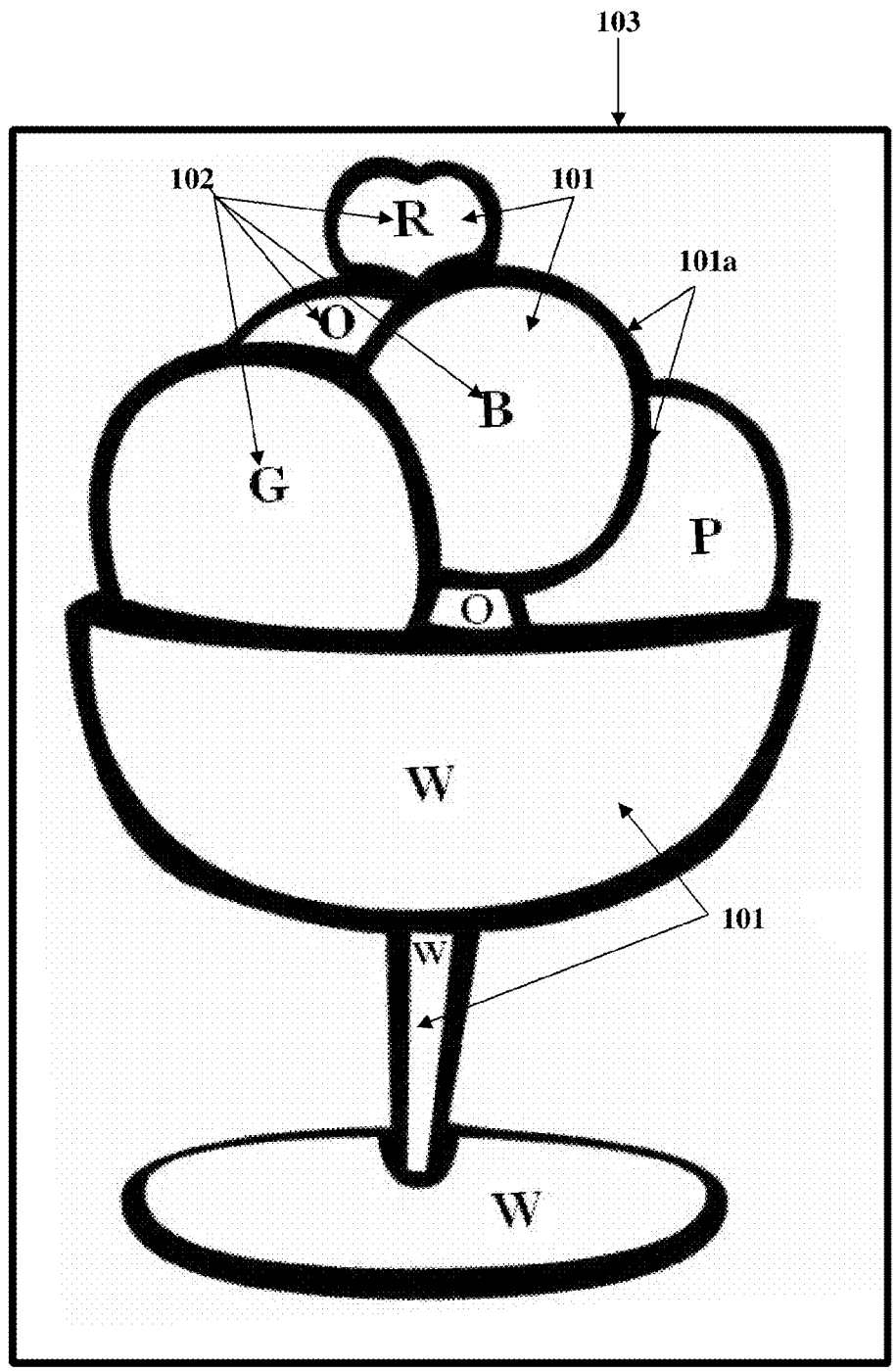
FIG. 4B exemplarily illustrates puzzle pieces marked with indicia representing different colors, placed adjacent to one another to assemble the ice cream sundae picture puzzle.

FIG. 4B exemplarily illustrates the puzzle pieces 101 marked with the indicia 102 W, G, P, O, R, and B representing different colors, placed adjacent to one another to assemble the ice cream sundae picture puzzle 103.

Figure 5A:
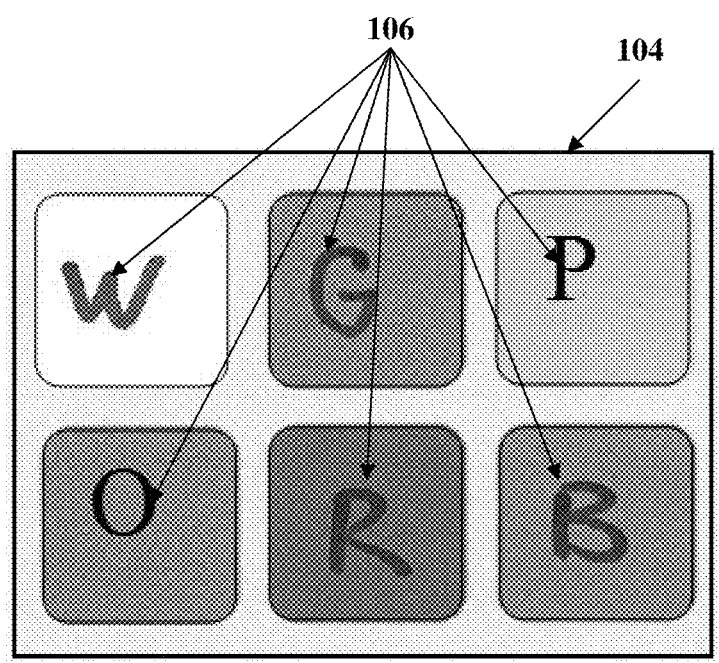
FIGS. 5A-5C exemplarily illustrate color charts for the ice cream sundae picture puzzle of FIG. 4B, displaying colors that correspond to the indicia marked on the puzzle pieces of the ice cream sundae picture puzzle.
Figure 5B:
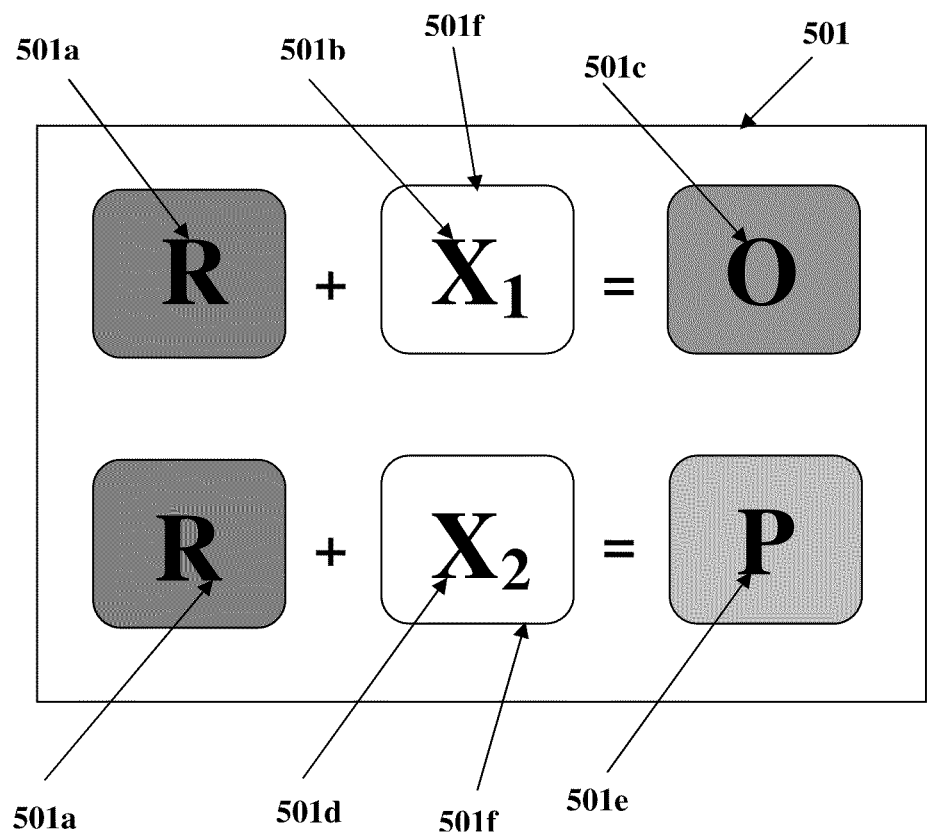
Figure 5C:
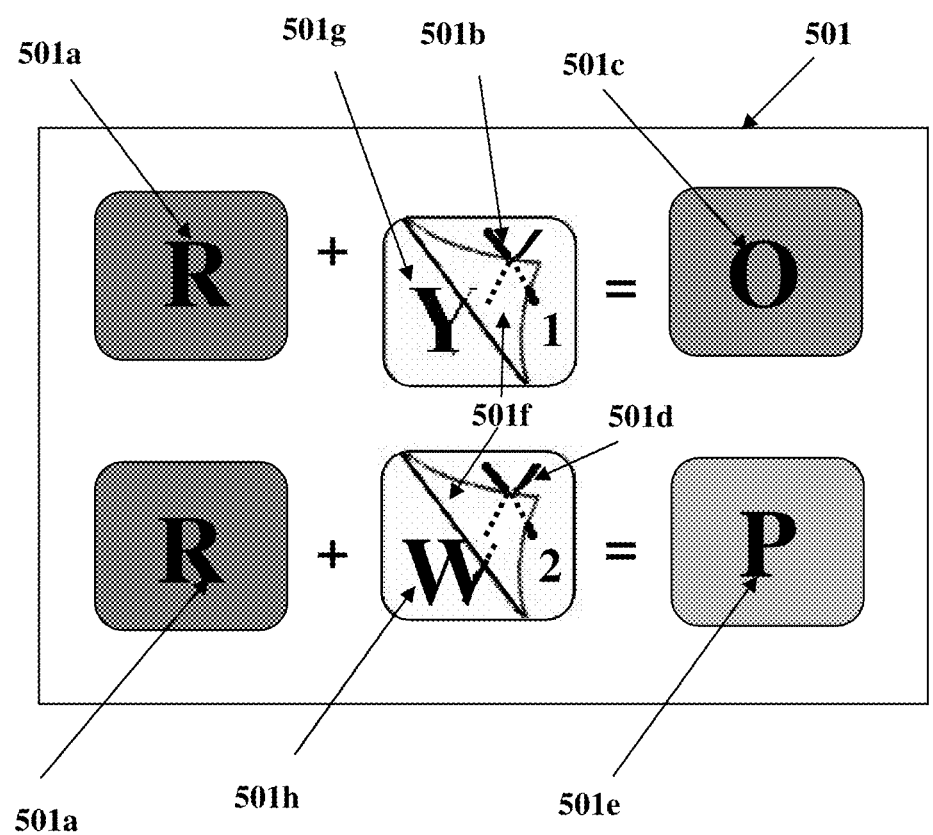

FIGS. 5A-5C exemplarily illustrate color charts 501 for the ice cream sundae picture puzzle 103 of FIG. 4B, displaying colors that correspond to the indicia 102 marked on the puzzle pieces 101 of the ice cream sundae picture puzzle 103. For example, a color chart 104 for the picture puzzle 103 of FIG. 4B comprises the indicia 102 W, G, P, O, R, and B against a background of the colors white, green, pink, orange, red, and blue respectively as exemplarily illustrated in FIG. 5A. A user, for example, a child will then color the puzzle pieces 101 with colors based on the background colors displayed on the color chart 104.

In an embodiment as exemplarily illustrated in FIGS. 5B-5C, the color chart 501 comprises a first indicia 501a corresponding to a first color, a non-indicative indicia 501b or 501d marked on a peelable layer 501f on the color chart 501, a hidden second indicia 501g or 501h corresponding to a second color positioned below the peelable layer 501f, and a third indicia 501c or 501e corresponding to a resultant third color that will be obtained by mixing the first color and the second color represented by the first indicia 501a and the hidden second indicia 501g or 501h respectively. The peelable layer 501f marked with the non-indicative indicia 501b or 501d is adjacent to and in removable contact with the hidden second indicia 501g or 501h. The peelable layer 501f is not marked with a color and is opaque and therefore the hidden second indicia 501g or 501h positioned below the peelable layer 501f marked with the non-indicative indicia 501b or 501d is not visible to the user as exemplarily illustrated in FIG. 5B. The user is required to determine the second color represented by the hidden second indicia 501g or 501h, that needs to be mixed with the first color represented by the first indicia 501a on the color chart 501, to obtain the resultant third color represented by the third indicia 501c or 501e on the color chart 501, since there is no color marked on the non-indicative indicia 501b or 501d.

If the user does not know the color represented by the non-indicative indicia 501b or 501d, the user can try to find the color represented by the non-indicative indicia 501b or 501d by trial and error, by mixing different colors with the first color represented by the first indicia 501a using the coloring tools 105 from the picture puzzle kit 100 exemplarily illustrated in FIG. 1. If the user fails to determine the second color, the user can remove the peelable layer 501f marked with the non-indicative indicia 501b or 501d to reveal the hidden second indicia 501g or 501h corresponding to the second color to be mixed with the first color for obtaining the resultant third color. FIG. 5C exemplarily illustrates the peelable layer 501f marked with the non-indicative indicia 501b or 501d that when peeled, reveals the hidden second indicia 501g or 501h. The user may then mix the first color represented by the first indicia 501a with the second color represented by the hidden second indicia 501g or 501h using the coloring tools 105 from the picture puzzle kit 100 to produce the resultant third color represented by the third indicia 501c or 501e. The user can then color a puzzle piece 101 marked with indicia 102 corresponding to the third indicia 501c or 501e with the produced third color.

Consider an example of a color chart 501 as exemplarily illustrated in FIGS. 5B-5C. The color chart 501 comprises a first indicia 501a marked "R" corresponding to the color red, a non-indicative indicia 501b marked "$X_1$" on a peelable layer 501f on the color chart 501, a hidden second indicia 501g marked "Y" positioned below the peelable layer 501f, and a third indicia 501c marked "O" corresponding to the resultant color orange that will be obtained by mixing colors represented by the first indicia 501a and the hidden second indicia 501g. The peelable layer 501f marked with the non-indicative indicia 501b "$X_1$" is in removable contact with the hidden second indicia 501g. The peelable layer 501f is not marked with a color and is opaque and therefore the hidden second indicia 501g positioned below the peelable layer 501f marked with the non-indicative indicia 501b "$X_1$", is not visible to the user as exemplarily illustrated in FIG. 5B. The user is required to determine the second color represented by the hidden second indicia 501g, that needs to be mixed with the color red represented by the first indicia 501a "R" on the color chart 501 to obtain the resultant color orange represented by the third indicia 501c "O" on the color chart 501, since there is no color marked on the non-indicative indicia 501b marked "$X_1$".

If the user does not know the color represented by the non-indicative indicia 501b marked "$X_1$", the user can try to find the color represented by the non-indicative indicia 501b marked "$X_1$" by trial and error, by mixing different colors with the color red represented by the first indicia 501a "R" using the coloring tools 105 from the picture puzzle kit 100. The user can continue mixing different colors with the color red till the user finds that by mixing the color red with the color yellow not shown on the color chart 501 illustrated in FIG. 5B and marked by the non-indicative indicia 501b "$X_1$", the resultant color produced is orange. The user can then use the produced orange color to color a puzzle piece 101 marked with indicia 102 "O". If the user cannot find the correct color to add to the color red to produce the color orange, the user can peel off the peelable layer 501f marked with non-indicative indicia 501b "$X_1$," to reveal the hidden second indicia 501g marked "Y" below the peelable layer 501f as exemplarily illustrated in FIG. 5C. The hidden second indicia 501g marked "Y" corresponds to the color yellow on the color chart 501. The user can then mix the color red represented by the first indicia 501a "R" and the color yellow represented by the hidden second indicia 501g marked "Y" using the coloring tools 105 to produce the color orange represented by the third indicia 501c "O" which the user can then use to color a puzzle piece 101 marked with indicia 102 "O".

Similarly, in another example, the color chart 501 illustrated in FIGS. 5B-5C comprises a first indicia 501a marked "R" corresponding to the color red, a non-indicative indicia 501d marked "$X_2$" on a peelable layer 501f on the color chart 501, a hidden second indicia 501h marked "W" positioned below the peelable layer 501f, and a third indicia 501e marked "P" corresponding to the resultant color pink that will be obtained by mixing colors represented by the first indicia 501a and the hidden second indicia 501h. The peelable layer 501f marked with the non-indicative indicia 501d "$X_2$" is in removable contact with the hidden second indicia 501h. The peelable layer 501f is not marked with a color and is opaque and therefore the hidden second indicia 501h positioned below the peelable layer 501f marked with the non-indicative indicia 501d "$X_2$", is not visible to the user as exemplarily illustrated in FIG. 5B. The user is required to determine the second color represented by the hidden second indicia 501h, that needs to be mixed with the color red represented by the first indicia 501a "R" on the color chart 501 to obtain the resultant color pink represented by the third indicia 501e "P" on the color chart 501, since there is no color marked on the non-indicative indicia 501d marked "$X_2$".

If the user does not know the color represented by the non-indicative indicia 501d marked "$X_2$", the user can try to find the color represented by the non-indicative indicia 501d marked "$X_2$" by trial and error, by mixing different colors with the color red represented by the first indicia 501a "R" using the coloring tools 105 from the picture puzzle kit 100. The user can continue mixing different colors with the color red till the user finds that by mixing the color red with the color white not shown on the color chart 501 illustrated in FIG. 5B and marked by the non-indicative indicia 501d "$X_2$", the resultant color produced is pink. The user can then use the produced pink color to color a puzzle piece 101 marked with indicia 102 "P". If the user cannot find the correct color to add to the color red to produce the color pink, the user can peel off the peelable layer 501f marked with non-indicative indicia 501d "$X_2$" to reveal the hidden second indicia 501h marked "W" below the peelable layer 501f as exemplarily illustrated in FIG. 5C. The hidden second indicia 501h marked "W" corresponds to the color white on the color chart 501. The user can then mix the color red represented by the first indicia 501a "R" and the color white represented by the hidden second indicia 501h marked "W" using the coloring tools 105 to produce the color pink represented by the third indicia 501e "P" which the user can then use to color a puzzle piece 101 marked with indicia 102 "P".

In an embodiment, the embedded audio assembly 700 exemplarily illustrated in FIG. 7 in the puzzle pieces 101 or the color chart 501 audibly indicates individual colors and a resultant color obtained by mixing the individual colors. For example, when a user presses a puzzle piece 101 marked with an indicia 102 "O" as exemplarily illustrated in FIG. 4A or presses an indicia 501c "O" on the color chart 501 as exemplarily illustrated in FIGS. 5B-5C, the speaker 701 in the embedded audio assembly 700 in the puzzle piece 101 or the color chart 501, audibly annunciates a message "Red and yellow produces orange". The user may then use the coloring tools 105 that are mixable, for example, paints, inks, dyes, or pigments to mix the color red with the color yellow to produce the color orange to color a puzzle piece 101 marked with indicia 102 "O".

Similarly, when a user presses a puzzle piece 101 marked with an indicia 102 "P" as exemplarily illustrated in FIG. 4A or presses an indicia 501e "P" on the color chart 501 as exemplarily illustrated in FIGS. 5B-5C, the speaker 701 in the embedded audio assembly 700 in the puzzle piece 101 or the color chart 501, audibly annunciates a message "Red and white produces pink". The user can then use the coloring tools 105 that are mixable, for example, paints, inks, dyes, or pigments to mix the color red with the color white to produce the color pink to color a puzzle piece 101 marked with indicia 102 "P".

The user may color the picture that has been assembled, in colors corresponding to the different colors displayed on the color charts 104 and 501 using the coloring tools 105 provided in the picture puzzle kit 100 exemplarily illustrated in FIG. 1. Each of the coloring tools 105 corresponds to one of the colors. The coloring tools 105 comprise, for example, crayons, inks, markers, dyes, pigments, or paints such as acrylic paints, oil paints, water colors, finger paints, etc. The picture puzzle kit 100 further comprises brushes for painting the picture puzzles 103 and 107 exemplarily illustrated in FIG. 4B and FIG. 2B respectively. The puzzle base used to support the puzzle pieces 101 may also be painted using the coloring tools 105. The user may color the picture before linking the puzzle pieces 101 or after linking the puzzle pieces 101 to assemble the picture puzzles 103 and 107. The picture puzzle kit 100 may be used to entertain a user and the puzzle pieces 101 may also be used as a play thing and/or a display item.

Figure 6A:
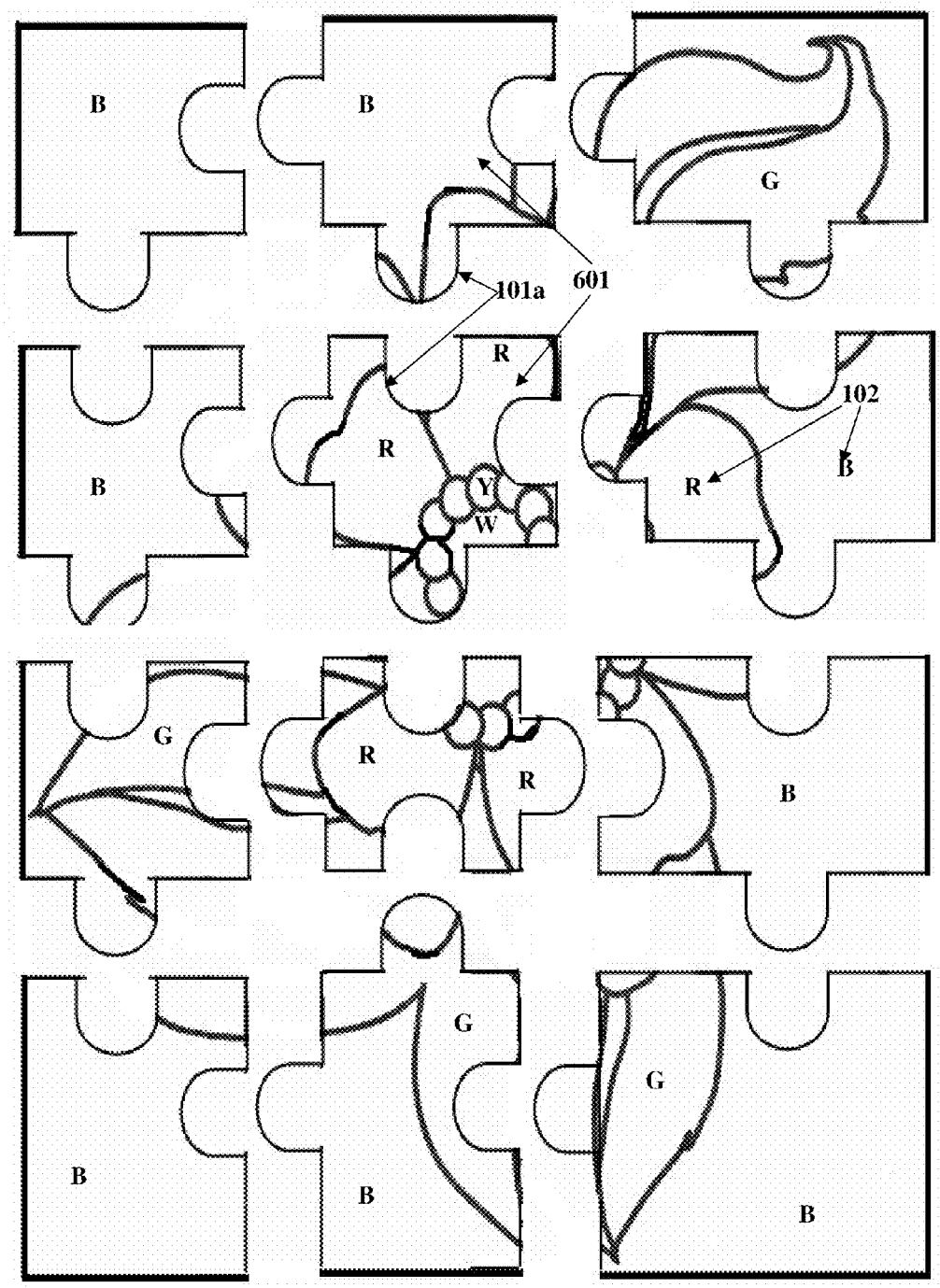
FIG. 6A exemplarily illustrates jigsaw puzzle pieces comprising parts of a picture of a flower.

FIG. 6A exemplarily illustrates jigsaw puzzle pieces 601 comprising parts of a picture of a flower. The jigsaw puzzle pieces 601 are marked with the indicia 102 W, G, Y, R, and B representing the colors white, green, yellow, red, and blue respectively.

Figure 6B:
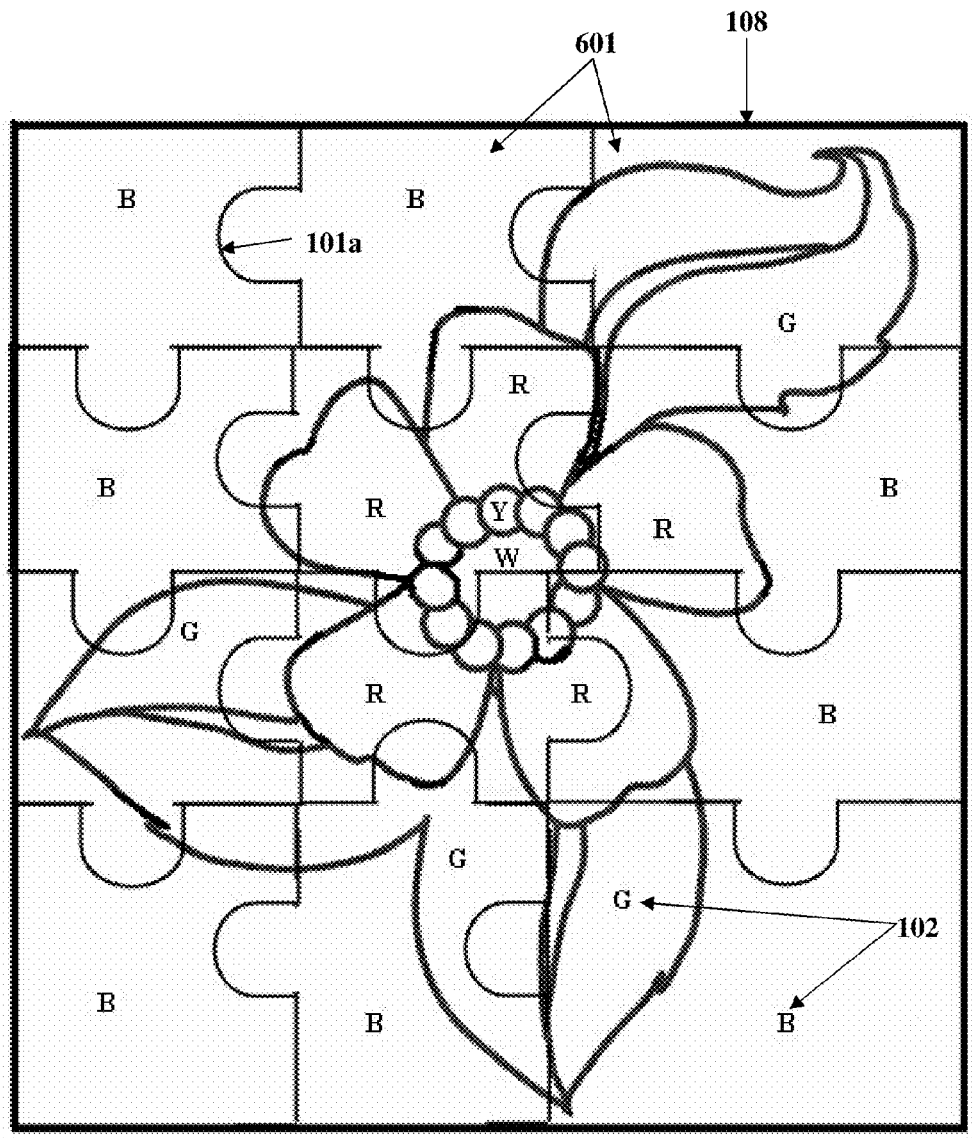
FIG. 6B exemplarily illustrates jigsaw puzzle pieces marked with indicia representing different colors, interlocked to assemble the flower picture puzzle.

FIG. 6B exemplarily illustrates jigsaw puzzle pieces 601 marked with indicia 102 W, G, Y, R, and B representing different colors, interlocked to assemble the flower picture puzzle 108. The flower picture puzzle 108 is assembled by interlocking the jigsaw puzzle pieces 601 as exemplarily illustrated in FIG. 6B. The jigsaw puzzle pieces 601 are of different shapes and sizes. The indicia 102 marked on the jigsaw puzzle pieces 601 enable the user to color the jigsaw puzzle pieces 601 using the color chart 104 exemplarily illustrated in FIG. 3 and the coloring tools 105 exemplarily illustrated in FIG. 1. The color chart 104 for the picture puzzle 108 of FIG. 6B is exemplarily illustrated in FIG. 3. The user uses the coloring tools 105 to apply the actual color on the jigsaw puzzle pieces 601. The puzzle base may also be used for supporting the jigsaw puzzle pieces 601.

FIG. 7 exemplarily illustrates a block diagram of a puzzle piece 101 embedded with an audio assembly 700 for audibly indicating one or more characteristics of the puzzle piece 101. The audio assembly 700 embedded in the puzzle piece 101 audibly indicates one or more characteristics of the puzzle piece 101 as disclosed in the detailed description of FIG. 2B. In an embodiment, the audio assembly 700 is also embedded in the color chart 104 for audibly indicating colors and corresponding indicia 106 displayed on the color chart 104 as disclosed in the detailed description of FIG. 3.

Figure 8:
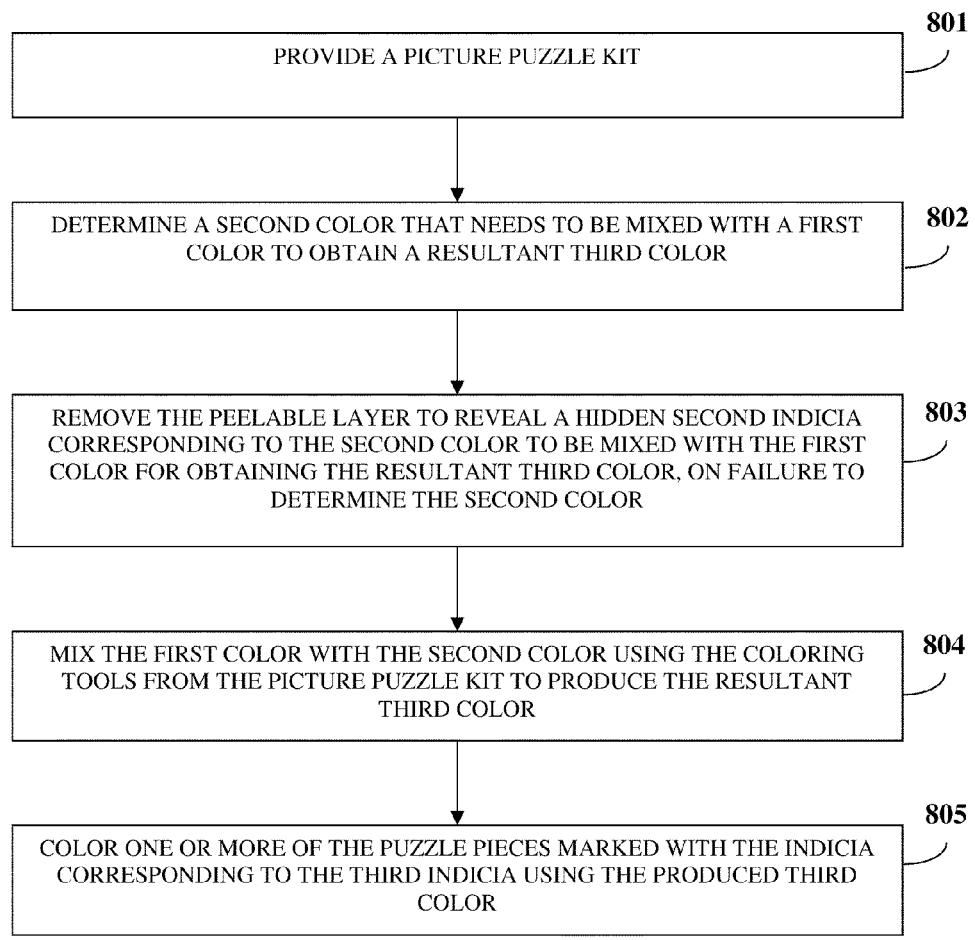
FIG. 8 exemplarily illustrates a method for coloring puzzle pieces of a picture puzzle using indicia marked on the puzzle pieces.

FIG. 8 exemplarily illustrates a method for coloring puzzle pieces 101 or 601 of a picture puzzle 103, 107, or 108 using indicia 102 marked on the puzzle pieces 101 or 601 exemplarily illustrated in FIG. 4B, FIG. 2B, and FIG. 6B respectively. A picture puzzle kit 100 comprising puzzle pieces 101 or 601 marked with indicia 102, one or more color charts 104 and 501 displaying colors corresponding to the indicia 102 marked on the puzzle pieces 101 or 601 as exemplarily illustrated in FIG. 1, FIG. 3, and FIGS. 5A-5C, and coloring tools 105 for coloring the puzzle pieces 101 or 601 with colors corresponding to the colors displayed on the color charts 104 and 501, which correspond to the indicia 102 marked on the puzzle pieces 101 or 601 as exemplarily illustrated FIG. 1 is provided 801. In an embodiment, a color chart 501 of the picture puzzle kit 100 comprises a first indicia 501a, a non-indicative indicia 501b or 501d, a hidden second indicia 501g or 501h, and a third indicia 501c or 501e as disclosed in the detailed description of FIGS. 5B-5C. The first indicia 501a corresponds to a first color. The non-indicative indicia 501b or 501d is marked on an opaque peelable layer 501f on the color chart 501. The peelable layer 501f marked with the non-indicative indicia 501b or 501d is adjacent to and in removable contact with the hidden second indicia 501g or 501h. The hidden second indicia 501g or 501h corresponds to a second color and is positioned immediately below the peelable layer 501f. The hidden second indicia 501g or 501h corresponding to the second color is revealed on removing the peelable layer 501f marked with the non-indicative indicia 501b or 501d as exemplarily illustrated in FIG. 5C. The third indicia 501c or 501e corresponds to a resultant third color that is obtained when the first color and the second color represented by the first indicia 501a and the hidden second indicia 501g or 501h respectively, are mixed. The coloring tools 105 of the picture puzzle kit 100 comprise multiple mixable colors for coloring the puzzle pieces 101 or 601 using the mixable colors.

A user determines 802 the second color represented by the hidden second indicia 501g or 501h on the color chart 501, that needs to be mixed with the first color represented by the first indicia 501a on the color chart 501 to obtain the resultant third color represented by the third indicia 501c or 501e on the color chart 501, by mixing multiple colors with the first color using the coloring tools 105 from the picture puzzle kit 100. If the user does not know the color represented by the non-indicative indicia 501b or 501d, the user can try to find the color represented by the non-indicative indicia 501b or 501d by trial and error, by mixing different colors with the first color represented by the first indicia 501a using the coloring tools 105 from the picture puzzle kit 100. If the user fails to determine the second color, the user can remove 803 the peelable layer 501f marked with the non-indicative indicia 501b or 501d to reveal the hidden second indicia 501g or 501h corresponding to the second color to be mixed with the first color for obtaining the resultant third color. The user then mixes 804 the first color represented by the first indicia 501a with the second color represented by the hidden second indicia 501g or 501h using the coloring tools 105 from the picture puzzle kit 100 to produce the resultant third color represented by the third indicia 501c or 501e. The user then colors 805 one or more of the puzzle pieces 101 or 601 marked with the indicia 102 corresponding to the third indicia 501c or 501e using the produced third color.

Figure 9:
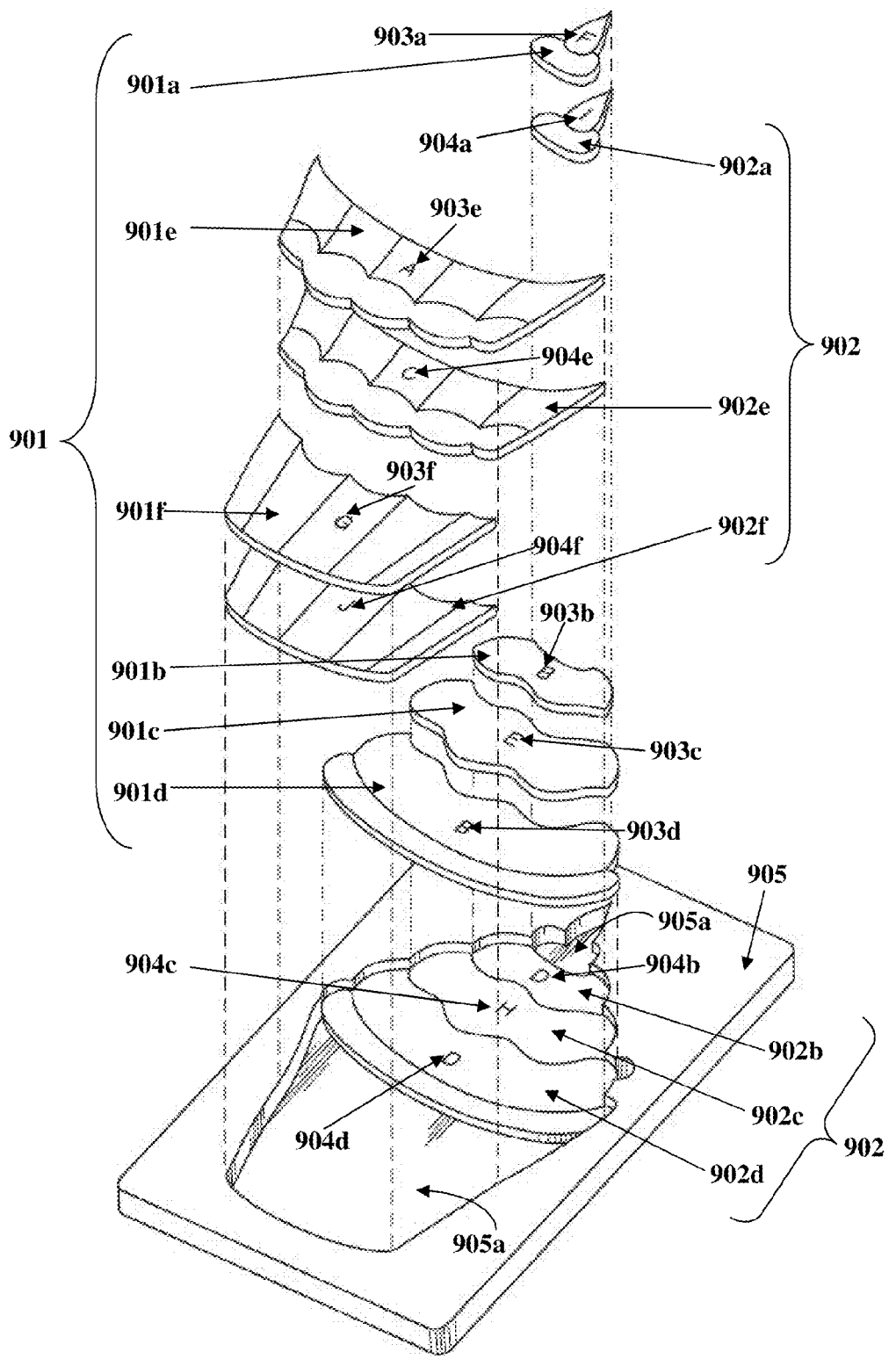
FIG. 9 exemplarily illustrates an exploded perspective view of two sets of puzzle pieces that define duplicate picture puzzles.
Figure 10:
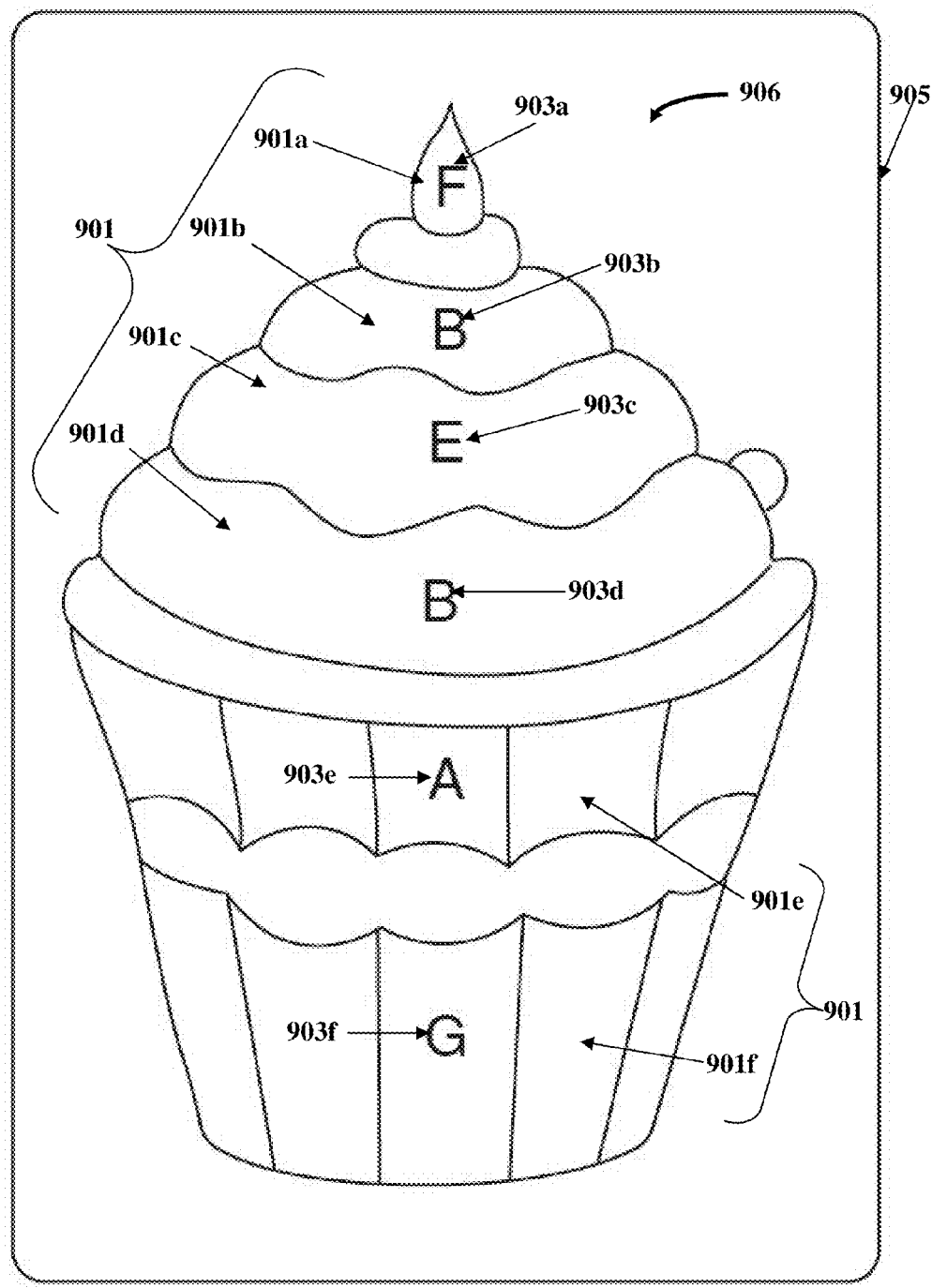
FIG. 10 exemplarily illustrates an orthogonal view of a first set of puzzle pieces linked to assemble a duplicate picture puzzle.
Figure 12:
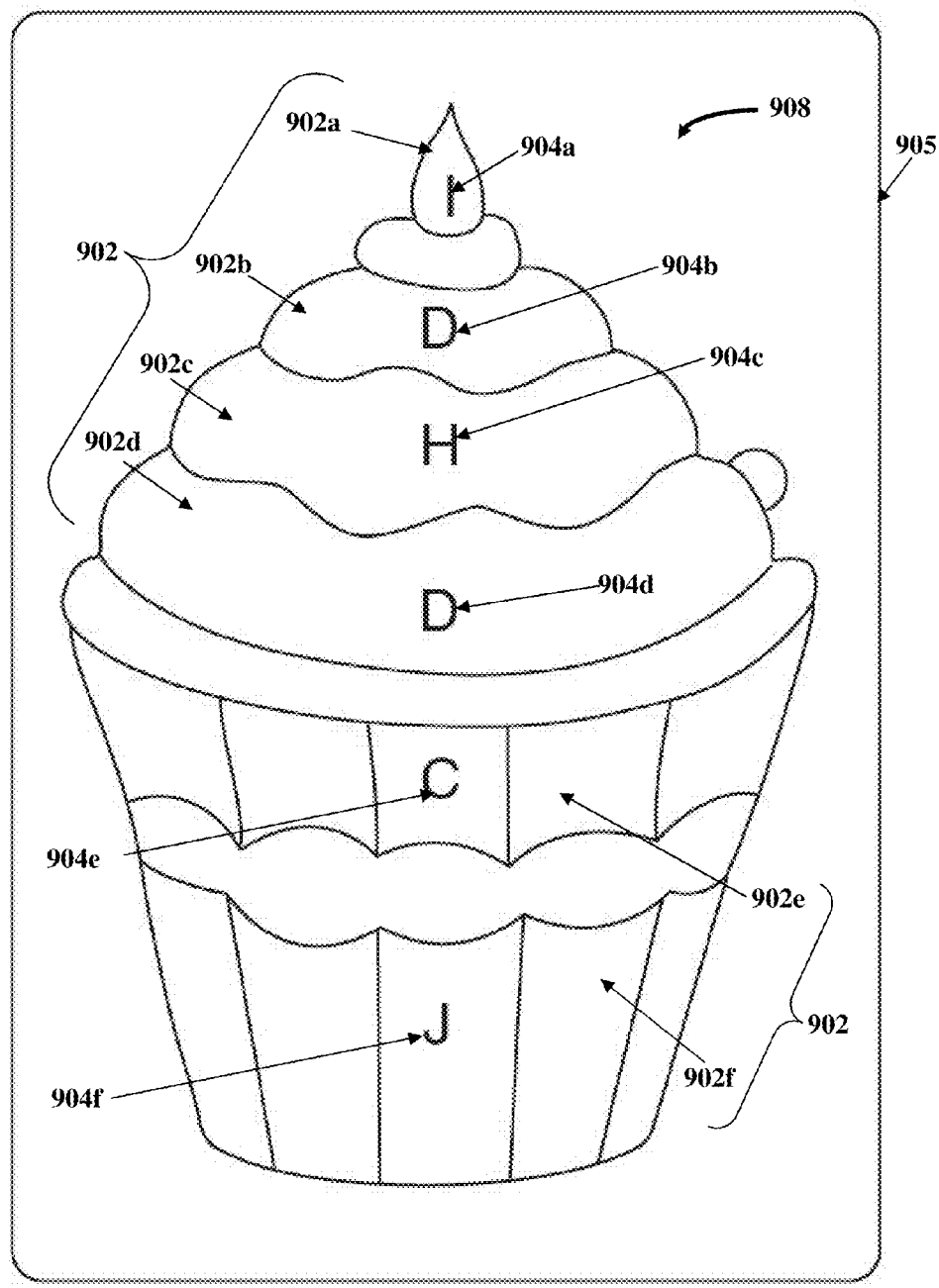
FIG. 12 exemplarily illustrates an orthogonal view of a second set of puzzle pieces linked to assemble another duplicate picture puzzle.

FIG. 9 exemplarily illustrates an exploded perspective view of two sets 901 and 902 of puzzle pieces 901a, 901b, 901c, 901d, 901e, 901f and 902a, 902b, 902c, 902d, 902e, 902f respectively that define duplicate picture puzzles 906 and 908 exemplarily illustrated in FIG. 10 and FIG. 12 respectively. In an embodiment, the picture puzzle kit 100 exemplarily illustrated in FIG. 1, further comprises two or more sets 901 and 902 of puzzle pieces 901a, 901b, 901c, 901d, 901e, 901f and 902a, 902b, 902c, 902d, 902e, 902f respectively. The puzzle pieces 901a, 901b, 901c, 901d, 901e, 901f and 902a, 902b, 902c, 902d, 902e, 902f in each set 901 and 902 respectively comprise parts that define a picture puzzle, for example, a cup cake picture puzzle 906 and 908 as exemplarily illustrated in FIG. 10 and FIG. 12 respectively. In this example, the puzzle pieces 901a, 901b, 901c, 901d, 901e, 901f and 902a, 902b, 902c, 902d, 902e, 902f are parts of a picture of a cup cake. For purposes of illustration, the detailed description refers to two sets 901 and 902 of puzzle pieces 901a, 901b, 901c, 901d, 901e, 901f and 902a, 902b, 902c, 902d, 902e, 902f respectively; however the scope of the picture puzzle kit 100 disclosed herein is not limited to two sets 901 and 902 of puzzle pieces 901a, 901b, 901c, 901d, 901e, 901f and 902a, 902b, 902c, 902d, 902e, 902f respectively but may be extended to include multiple sets of puzzle pieces 901a, 901b, 901c, 901d, 901e, 901f and 902a, 902b, 902c, 902d, 902e, 902f, etc., that define multiple duplicate picture puzzles 906, 908, etc. The two sets 901 and 902 of puzzle pieces 901a, 901b, 901c, 901d, 901e, 901f and 902a, 902b, 902c, 902d, 902e, 902f respectively are herein referred to as a first set 901 and a second set 902.

Each of the puzzle pieces 901a, 901b, 901c, 901d, 901e, 901f and 902a, 902b, 902c, 902d, 902e, 902f in the first set 901 and the second set 902 respectively has a length, a width, and a thickness, the thickness being small compared to the length and the width. Each of the puzzle pieces 901a, 901b, 901c, 901d, 901e, 901f and 902a, 902b, 902c, 902d, 902e, 902f defines an outside edge being configured to mate with outside edges of at least one other of the puzzle pieces 901a, 901b, 901c, 901d, 901e, 901f and 902a, 902b, 902c, 902d, 902e, 902f.

The puzzle pieces 901a, 901b, 901c, 901d, 901e, 901f and 902a, 902b, 902c, 902d, 902e, 902f are made of, for example, wood, pressed wood, etc. A wooden piece configured in the shape of a puzzle piece is laterally sliced to create two puzzle pieces, for example, 901a and 902a of the same shape and size. The thickness of each of the puzzle pieces 901a, 901b, 901c, 901d, 901e, 901f and 902a, 902b, 902c, 902d, 902e, 902f is, for example, about 4 mm to about 4.5 mm. In this manner, two sets 901 and 902 of puzzle pieces 901a, 901b, 901c, 901d, 901e, 901f and 902a, 902b, 902c, 902d, 902e, 902f respectively that define duplicate picture puzzles 906 and 908 as exemplarily illustrated in FIG. 10 and FIG. 12 respectively are manufactured, where the puzzle pieces 901a, 901b, 901c, 901d, 901e, and 901f in the first set 901 are duplicates of the corresponding puzzle pieces 902a, 902b, 902c, 902d, 902e, and 902f respectively in the second set 902. The wooden piece configured in the shape of a puzzle piece may also be laterally sliced multiple times based on the thickness of the wooden piece to create multiple puzzle pieces, for example, 901a, 902a, etc., of the same shape and size.

The puzzle pieces 901a, 901b, 901c, 901d, 901e, 901f and 902a, 902b, 902c, 902d, 902e, 902f in each of the first set 901 and the second set 902 respectively are linked for assembling the duplicate picture puzzles 906 and 908. The corresponding puzzle pieces 901a, 901b, 901c, 901d, 901e, 901f and 902a, 902b, 902c, 902d, 902e, 902f of the two sets 901 and 902 respectively are interchangeable for creating duplicate picture puzzles 906 and 908 exemplarily illustrated in FIG. 10 and FIG. 12 respectively of different colors.

Each of the puzzle pieces 901a, 901b, 901c, 901d, 901e, 901f and 902a, 902b, 902c, 902d, 902e, 902f in the two sets 901 and 902 respectively is marked with and display indicia 903a, 903b, 903c, 903d, 903e, 903f and 904a, 904b, 904c, 904d, 904e, 904f respectively corresponding to a color. The indicia 903a, 903b, 903c, 903d, 903e, 903f and 904a, 904b, 904c, 904d, 904e, 904f displayed on the puzzle pieces 901a, 901b, 901c, 901d, 901e, 901f and 902a, 902b, 902c, 902d, 902e, 902f respectively are marked, for example, by stamping, engraving, imprinting, impressing, etc. The indicia 903a, 903b, 903c, 903d, 903e, and 903f marked on the puzzle pieces 901a, 901b, 901c, 901d, 901e, and 901f respectively in the first set 901 are distinct from the indicia 904a, 904b, 904c, 904d, 904e, and 904f marked on the puzzle pieces 902a, 902b, 902c, 902d, 902e, and 902f respectively in the second set 902. For example, the puzzle pieces 901a, 901b, 901c, 901d, 901e, and 901f in the first set 901 are marked with the indicia F 903a, B 903b, E 903c, B 903d, A 903e, and G 903f corresponding to the colors yellow, brown, white, brown, lavender, and pink respectively. The puzzle pieces 902a, 902b, 902c, 902d, 902e, and 902f in the second set 902 are marked with indicia, for example, I 904a, D 904b, H 904c, D 904d, C 904e, and J 904f corresponding to the colors purple, blue, red, blue, green, and orange respectively.

The picture puzzle kit 100 disclosed herein enables a user to color duplicate picture puzzles 906 and 908 with different colors based on the distinct indicia 903a, 903b, 903c, 903d, 903e, 903f and 904a, 904b, 904c, 904d, 904e, 904f marked on the puzzle pieces 901a, 901b, 901c, 901d, 901e, 901f and 902a, 902b, 902c, 902d, 902e, 902f respectively and corresponding to different colors. In an embodiment, the picture puzzle kit 100 disclosed herein further comprises a puzzle base 905 having one or more cavities 905a configured to conform to the duplicate picture puzzles 906 and 908 for accommodating each of the puzzle pieces 901a, 901b, 901c, 901d, 901e, 901f and 902a, 902b, 902c, 902d, 902e, 902f in the first set 901 and the second set 902 respectively as exemplarily illustrated in FIG. 9. The puzzle pieces 901a, 901b, 901c, 901d, 901e, and 901f in the first set 901 are placed above the corresponding puzzle pieces 902a, 902b, 902c, 902d, 902e, and 902f in the second set 902 in the cavities 905a of the puzzle base 905. The thickness of the puzzle base 905 is, for example, about 3 mm to about 4 mm.

In an embodiment, the puzzle pieces are shaped as jigsaw puzzle pieces 601 for interlocking adjacent puzzle pieces 601 as disclosed in the detailed description of FIGS. 6A-6B. In this embodiment, a wooden piece configured in the shape of a jigsaw puzzle piece is laterally sliced to create two jigsaw puzzle pieces (not shown) or multiple jigsaw puzzle pieces (not shown) of the same shape and size. In this manner, two or more sets of jigsaw puzzle pieces that define duplicate jigsaw picture puzzles (not shown) are manufactured, where the jigsaw puzzle pieces in the first set are duplicates of the corresponding jigsaw puzzle pieces in the second set and other sets. The jigsaw puzzle pieces in each of the first set and the second set are interlocked for assembling the duplicate jigsaw picture puzzles. The jigsaw puzzle pieces in the first set are placed above the corresponding jigsaw puzzle pieces in the second set in the cavities 905a of the puzzle base 905.

FIG. 10 exemplarily illustrates an orthogonal view of a first set 901 of puzzle pieces 901a, 901b, 901c, 901d, 901e, and 901f linked to assemble a duplicate picture puzzle 906. The puzzle pieces 901a, 901b, 901c, 901d, 901e, and 901f in the first set 901 are linked, for example, by placing the puzzle pieces 901a, 901b, 901c, 901d, 901e, and 901f adjacent to one another to define a cup cake picture puzzle 906 as exemplarily illustrated in FIG. 10. The puzzle pieces 901a, 901b, 901c, 901d, 901e, and 901f in the first set 901 are marked with the indicia F 903a, B 903b, E 903c, B 903d, A 903e, and G 903f corresponding to the colors yellow, brown, white, brown, lavender, and pink respectively. A user colors the puzzle pieces 901a, 901b, 901c, 901d, 901e, and 901f in the first set 901 based on the colors displayed on a color chart 907, as exemplarily illustrated in FIG. 11, corresponding to the distinct indicia 903a, 903b, 903c, 903d, 903e, and 903f marked on the puzzle pieces 901a, 901b, 901c, 901d, 901e, and 901f respectively.

Figure 11:
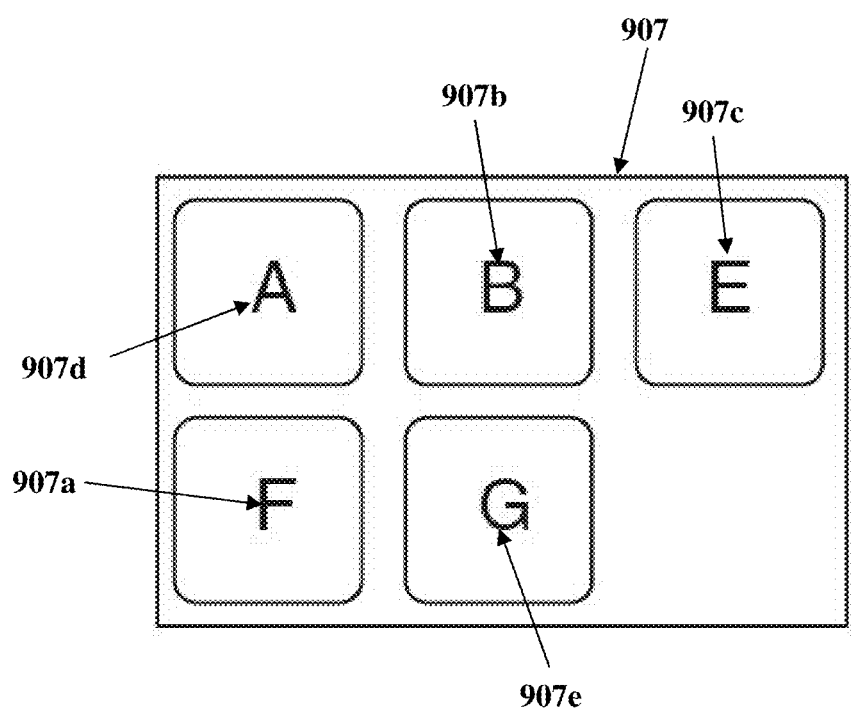
FIG. 11 exemplarily illustrates a color chart for enabling a user to color the first set of puzzle pieces.

FIG. 11 exemplarily illustrates a color chart 907 for enabling a user to color the first set 901 of puzzle pieces 901a, 901b, 901c, 901d, 901e, and 901f exemplarily illustrated in FIG. 10. The color chart 907 displays multiple colors corresponding to distinct indicia 903a, 903b, 903c, 903d, 903e, and 903f marked on the puzzle pieces 901a, 901b, 901c, 901d, 901e, and 901f respectively in the first set 901 as exemplarily illustrated in FIG. 10. The color chart 907 displays the colors with corresponding indicia 907a, 907b, 907c, 907d, and 907e by superimposing the corresponding indicia 907a, 907b, 907c, 907d, and 907e against a background of colors. For example, indicia F 907a is superimposed against a yellow background in the color chart 907. The color chart 907 for the picture puzzle 906 illustrated in FIG. 10 displays indicia, for example, F 907a, B 907b, E 907c, A 907d, and G 907e against background colors yellow, brown, white, lavender, and pink respectively. The user can then infer that the indicia F 907a corresponds to the color yellow and may then color a puzzle piece 901a marked with the indicia F 903a with a yellow color using the coloring tools 105 provided in the picture puzzle kit 100 exemplarily illustrated in FIG. 1.

Similarly, the user can infer that the indicia B 907b, E 907c, A 907d, and G 907e correspond to the colors brown, white, lavender, and pink respectively and may then color the puzzle pieces 901b, 901c, 901d, 901e, and 901f marked with the indicia B 903b, E 903c, B 903d, A 903e, and G 903f in FIG. 10 with the colors brown, white, brown, lavender, and pink respectively using the coloring tools 105 provided in the picture puzzle kit 100. The coloring tools 105, exemplarily illustrated in FIG. 1, comprising, for example, paints, crayons, inks, markers, dyes, pigments, etc., enable the user to color the puzzle pieces 901a, 901b, 901c, 901d, 901e, and 901f in the first set 901 with colors corresponding to the colors displayed on the color chart 907, which correspond to the distinct indicia 903a, 903b, 903c, 903d, 903e, and 903f marked on the puzzle pieces 901a, 901b, 901c, 901d, 901e, and 901f.

FIG. 12 exemplarily illustrates an orthogonal view of a second set 902 of puzzle pieces 902a, 902b, 902c, 902d, 902e, and 902f linked to assemble another duplicate picture puzzle 908. The puzzle pieces 902a, 902b, 902c, 902d, 902e, and 902f in the second set 902 are linked, for example, by placing the puzzle pieces 902a, 902b, 902c, 902d, 902e, and 902f adjacent to one another to define a cup cake picture puzzle 908 as exemplarily illustrated in FIG. 12. The puzzle pieces 902a, 902b, 902c, 902d, 902e, and 902f in the second set 902 are marked with the indicia I 904a, D 904b, H 904c, D 904d, C 904e, and J 904f corresponding to the colors, for example, purple, blue, red, blue, green, and orange respectively. A user colors the puzzle pieces 902a, 902b, 902c, 902d, 902e, and 902f in the second set 902 based on the colors displayed on another color chart 909, as exemplarily illustrated in FIG. 13, corresponding to the distinct indicia 904a, 904b, 904c, 904d, 904e, and 904f marked on the puzzle pieces 902a, 902b, 902c, 902d, 902e, and 902f.

Figure 13:
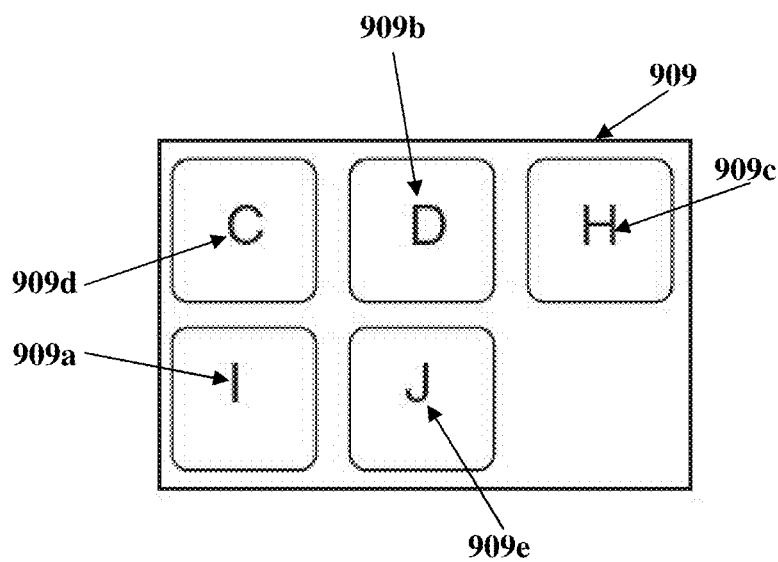
FIG. 13 exemplarily illustrates a color chart for enabling a user to color the second set of puzzle pieces.

FIG. 13 exemplarily illustrates a color chart 909 for enabling a user to color the second set 902 of puzzle pieces 902a, 902b, 902c, 902d, 902e, and 902f exemplarily illustrated in FIG. 12. The color chart 909 displays multiple colors corresponding to distinct indicia 904a, 904b, 904c, 904d, 904e, and 904f marked on the puzzle pieces 902a, 902b, 902c, 902d, 902e, and 902f respectively in the second set 902 exemplarily illustrated in FIG. 12. The color chart 909 displays the colors with corresponding indicia 909a, 909b, 909c, 909d, and 909e by superimposing the corresponding indicia 909a, 909b, 909c, 909d, and 909e against a background of colors. For example, indicia I 909a is superimposed against a purple background in the color chart 909. The color chart 909 for the picture puzzle 908 illustrated in FIG. 12 displays indicia, for example, I 909a, D 909b, H 909c, C 909d, and J 909e against background colors purple, blue, red, green, and orange respectively. The user can then infer that the indicia I 909a corresponds to the color purple and may then color the puzzle piece 902a marked with the indicia I 909a with a purple color using the coloring tools 105 provided in the picture puzzle kit 100 exemplarily illustrated in FIG. 1. Similarly, the user can infer that the indicia D 909b, H 909c, C 909d, and J 909e correspond to the colors blue, red, green, and orange respectively and may then color the puzzle pieces 902b, 902c, 902d, 902e, and 902f marked with the indicia D 904b, H 904c, D 904d, C 904e, and J 904f in FIG. 12 with the colors blue, red, blue, green, and orange respectively using the coloring tools 105 provided in the picture puzzle kit 100. The coloring tools 105, exemplarily illustrated in FIG. 1, enable the user to color the puzzle pieces 902a, 902b, 902c, 902d, 902e, and 902f in the second set 902 with colors corresponding to the colors displayed on the color chart 909, which correspond to the distinct indicia 904a, 904b, 904c, 904d, 904e, and 904f marked on the puzzle pieces 902a, 902b, 902c, 902d, 902e, and 902f.

Separate color charts 907 and 909 are provided as exemplarily illustrated in FIG. 11 and FIG. 13 for enabling the user to color the first set 901 of puzzle pieces 901a, 901b, 901c, 901d, 901e, and 901f and the second set 902 of puzzle pieces 902a, 902b, 902c, 902d, 902e, and 902f respectively with different colors. This enables the user to color each of the duplicate picture puzzles 906 and 908 exemplarily illustrated in FIG. 10 and FIG. 12 respectively with different colors. The user may then interchange corresponding colored puzzle pieces 901a, 901b, 901c, 901d, 901e, 901f and 902a, 902b, 902c, 902d, 902e, 902f in the sets 901 and 902 respectively for creating the duplicate picture puzzles 906 and 908 of different colors. The puzzle pieces 901a, 901b, 901c, 901d, 901e, 901f and 902a, 902b, 902c, 902d, 902e, 902f in the two sets 901 and 902 respectively together define duplicate picture puzzles 906 and 908 when the outside edge of each of the puzzle pieces 901a, 901b, 901c, 901d, 901e, 901f and 902a, 902b, 902c, 902d, 902e, 902f in each of the two sets 901 and 902 are mated one to another and each one of the puzzle pieces 901a, 901b, 901c, 901d, 901e, 901f and 902a, 902b, 902c, 902d, 902e, 902f is colored with colors corresponding to the colors associated by the two color charts 907 and 909 with the indicia 903a, 903b, 903c, 903d, 903e, 903f and 904a, 904b, 904c, 904d, 904e, 904f marked on the puzzle pieces 901a, 901b, 901c, 901d, 901e, 901f and 902a, 902b, 902c, 902d, 902e, 902f respectively as exemplarily illustrated in FIG. 9, FIG. 10, and FIG. 12, using the coloring tools 105.

Figure 14:
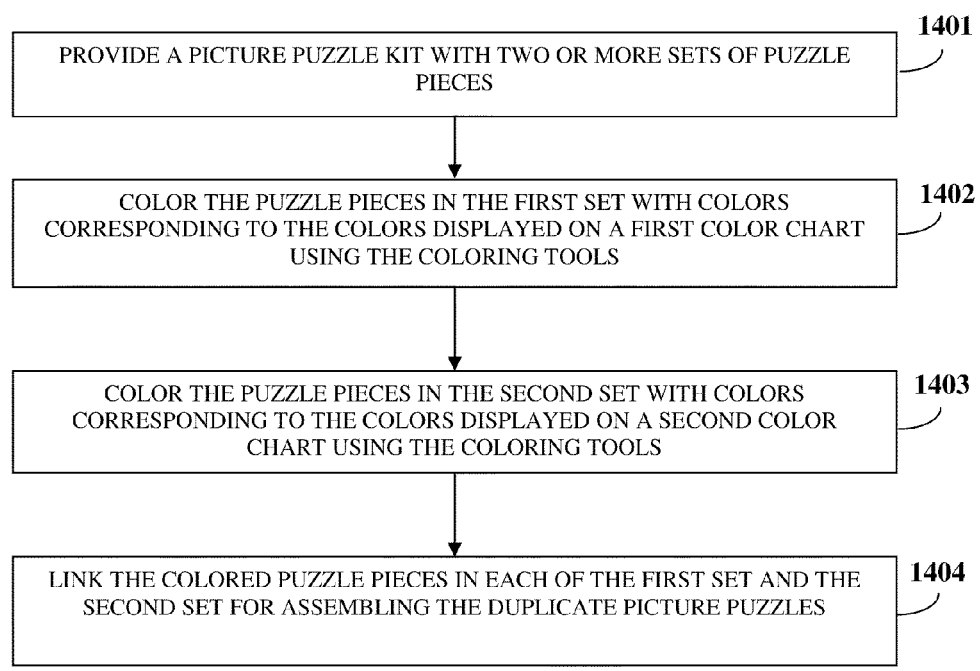
FIG. 14 exemplarily illustrates a method for coloring and assembling duplicate picture puzzles marked with distinct indicia corresponding to multiple colors.

FIG. 14 exemplarily illustrates a method for coloring and assembling duplicate picture puzzles 906 and 908 marked with distinct indicia 903a, 903b, 903c, 903d, 903e, 903f and 904a, 904b, 904c, 904d, 904e, 904f exemplarily illustrated in FIG. 10 and FIG. 12 respectively, corresponding to multiple colors. A picture puzzle kit 100 with two or more sets 901 and 902 of puzzle pieces 901a, 901b, 901c, 901d, 901e, 901f and 902a, 902b, 902c, 902d, 902e, 902f respectively as disclosed in the detailed description of FIGS. 9-13 is provided 1401. The puzzle pieces 901a, 901b, 901c, 901d, 901e, and 901f in the first set 901 are colored 1402 with colors corresponding to the colors displayed on one of the color charts 907 and 909, for example, the color chart 907 exemplarily illustrated in FIG. 11, using the coloring tools 105 provided in the picture puzzle kit 100 exemplarily illustrated in FIG. 1, by associating the indicia 903a, 903b, 903c, 903d, 903e, and 903f marked on the puzzle pieces 901a, 901b, 901c, 901d, 901e, and 901f respectively with corresponding indicia 907a, 907b, 907c, 907d, and 907e and the colors displayed on the color chart 907. The puzzle pieces 902a, 902b, 902c, 902d, 902e, and 902f in the second set 902 are colored 1403 with colors corresponding to the colors displayed on the other of the color charts 907 and 909, for example, the color chart 909 exemplarily illustrated in FIG. 13, using the coloring tools 105 provided in the picture puzzle kit 100, by associating the indicia 904a, 904b, 904c, 904d, 904e, and 904f marked on the puzzle pieces 902a, 902b, 902c, 902d, 902e, and 902f respectively with corresponding indicia 909a, 909b, 909c, 909d, and 909e and the colors displayed on the color chart 909. The colored puzzle pieces 901a, 901b, 901c, 901d, 901e, 901f and 902a, 902b, 902c, 902d, 902e, 902f in the first set 901 and the second set 902 respectively are linked 1404 for assembling the duplicate picture puzzles 906 and 908 as exemplarily illustrated in FIG. 10 and FIG. 12 respectively. In an embodiment, the user interchanges corresponding colored puzzle pieces 901a, 901b, 901c, 901d, 901e, 901f and 902a, 902b, 902c, 902d, 902e, 902f in the first set 901 and the second set 902 respectively for creating the duplicate picture puzzles 906 and 908 of different colors.

Consider an example where the user uses the picture puzzle kit 100 for coloring duplicate picture puzzles 906 and 908 as exemplarily illustrated in FIG. 10 and FIG. 12. The picture puzzle kit 100 comprises a first set 901 of puzzle pieces 901a, 901b, 901c, 901d, 901e, and 901f marked with indicia 903a, 903b, 903c, 903d, 903e, and 903f respectively corresponding to colors and a second set 902 of puzzle pieces 902a, 902b, 902c, 902d, 902e, and 902f marked with indicia 904a, 904b, 904c, 904d, 904e, and 904f respectively corresponding to colors as exemplarily illustrated in FIGS. 9-10 and FIG. 12. The indicia 903a, 903b, 903c, 903d, 903e, and 903f marked on the puzzle pieces 901a, 901b, 901c, 901d, 901e, and 901f in the first set 901 are distinct from the indicia 904a, 904b, 904c, 904d, 904e, and 904f marked on the puzzle pieces 902a, 902b, 902c, 902d, 902e, and 902f in the second set 902. The picture puzzle kit 100 further comprises two color charts 907 and 909 as exemplarily illustrated in FIG. 11 and FIG. 13 respectively. The first color chart 907 is associated with the first set 901 of puzzle pieces 901a, 901b, 901c, 901d, 901e, and 901f, while the second color chart 909 is associated with the second set 902 of puzzle pieces 902a, 902b, 902c, 902d, 902e, and 902f. The first color chart 907 displays colors with corresponding indicia 907a, 907b, 907c, 907d, and 907e that match the indicia 903a, 903b, 903c, 903d, 903e, and 903f marked on the puzzle pieces 901a, 901b, 901c, 901d, 901e, and 901f respectively in the first set 901. The second color chart 909 displays colors with corresponding indicia 909a, 909b, 909c, 909d, and 909e that match the indicia 904a, 904b, 904c, 904d, 904e, and 904f marked on the puzzle pieces 902a, 902b, 902c, 902d, 902e, and 902f respectively in the second set 902.

The user colors the puzzle pieces 901a, 901b, 901c, 901d, 901e, and 901f of the first set 901 based the indicia 903a, 903b, 903c, 903d, 903e, and 903f marked on the puzzle pieces 901a, 901b, 901c, 901d, 901e, and 901f respectively and the corresponding colors marked on the first color chart 907. The user then links the puzzle pieces 901a, 901b, 901c, 901d, 901e, and 901f in the first set 901 by placing the colored puzzle pieces 901a, 901b, 901c, 901d, 901e, and 901f adjacent to one another in the cavities 905a of the puzzle base 905 exemplarily illustrated in FIG. 9, to form a picture puzzle 906 as exemplarily illustrated in FIG. 10. The user then colors the puzzle pieces 902a, 902b, 902c, 902d, 902e, and 902f of the second set 902 based on the indicia 904a, 904b, 904c, 904d, 904e, and 904f marked on the puzzle pieces 902a, 902b, 902c, 902d, 902e, and 902f respectively and the corresponding colors marked on the second color chart 909. The user then links the puzzle pieces 902a, 902b, 902c, 902d, 902e, and 902f in the second set 902 by placing the colored puzzle pieces 902a, 902b, 902c, 902d, 902e, and 902f adjacent to one another above the first set 901 to form a picture puzzle 908 as exemplarily illustrated in FIG. 12. The picture puzzle 908 exemplarily illustrated in FIG. 12 is a duplicate of the picture puzzle 906 exemplarily illustrated in FIG. 10 but colored differently. The user can thereby create the same picture defined by the duplicate picture puzzles 906 and 908 with different color schemes.

The duplicate picture puzzles 906 and 908 when placed one above the other have multiple possible variations, when the colors of the bottom puzzle pieces 902a, 902b, 902c, 902d, 902e, and 902f shows through any of the removed top puzzle pieces 901a, 901b, 901c, 901d, 901e, and 901f as exemplarily illustrated in FIG. 9. The top puzzle pieces 901a, 901b, 901c, 901d, 901e, and 901f can also become the bottom puzzle pieces 902a, 902b, 902c, 902d, 902e, and 902f and vice versa.

Figure 15:
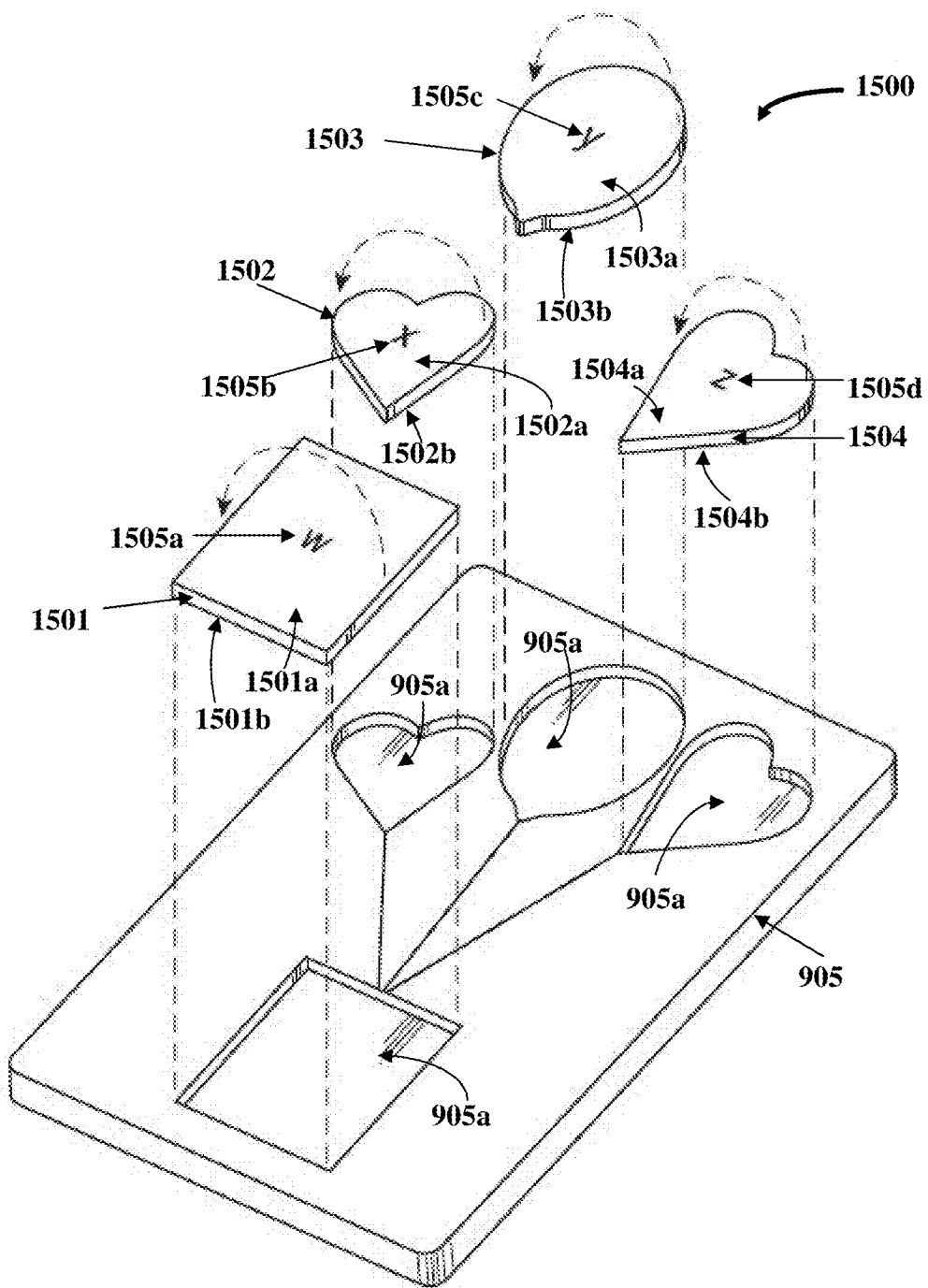
FIG. 15 exemplarily illustrates an exploded perspective view of flippable puzzle pieces marked with indicia on opposing sides of the flippable puzzle pieces.

FIG. 15 exemplarily illustrates an exploded perspective view of flippable puzzle pieces 1501, 1502, 1503, and 1504 marked with indicia 1505a, 1505b, 1505c, 1505d and 1505e, 1505f, 1505g, 1505h on opposing sides 1501a, 1502a, 1503a, 1504a and 1501b, 1502b, 1503b, 1504b respectively of the flippable puzzle pieces 1501, 1502, 1503, and 1504. In an embodiment, the puzzle pieces 1501, 1502, 1503, and 1504 are marked with indicia 1505a, 1505b, 1505c, 1505d and 1505e, 1505f, 1505g, 1505h on the first opposing sides 1501a, 1502a, 1503a, and 1504a and the second opposing sides 1501b, 1502b, 1503b, and 1504b respectively of the puzzle pieces 1501, 1502, 1503, and 1504, where the indicia 1505a, 1505b, 1505c, and 1505d marked on the first opposing sides 1501a, 1502a, 1503a, and 1504a of the puzzle pieces 1501, 1502, 1503, and 1504 respectively are distinct from the indicia 1505e, 1505f, 1505g, and 1505h marked on the second opposing sides 1501b, 1502b, 1503b, and 1504b of the puzzle pieces 1501, 1502, 1503, and 1504 respectively. These puzzle pieces 1501, 1502, 1503, and 1504 are flippable for creating the same picture puzzle 1500 with different colors. Consider an example of a picture puzzle 1500 comprising four flippable puzzle pieces 1501, 1502, 1503, and 1504. The four flippable puzzle pieces 1501, 1502, 1503, and 1504 are marked with indicia W 1505a, X 1505b, Y 1505c, and Z 1505d corresponding to the colors red, yellow, green, and blue respectively on the first opposing sides 1501a, 1502a, 1503a, and 1504a of the puzzle pieces 1501, 1502, 1503, and 1504 respectively as exemplarily illustrated in FIGS. 15-16, while the second opposing sides 1501b, 1502b, 1503b, and 1504b of the flippable puzzle pieces 1501, 1502, 1503, and 1504 are marked with indicia Q 1505e, R 1505f, S 1505g, and T 1505h respectively, as exemplarily illustrated in FIGS. 18-19, corresponding to the colors orange, purple, white, and pink respectively.

Figure 17:
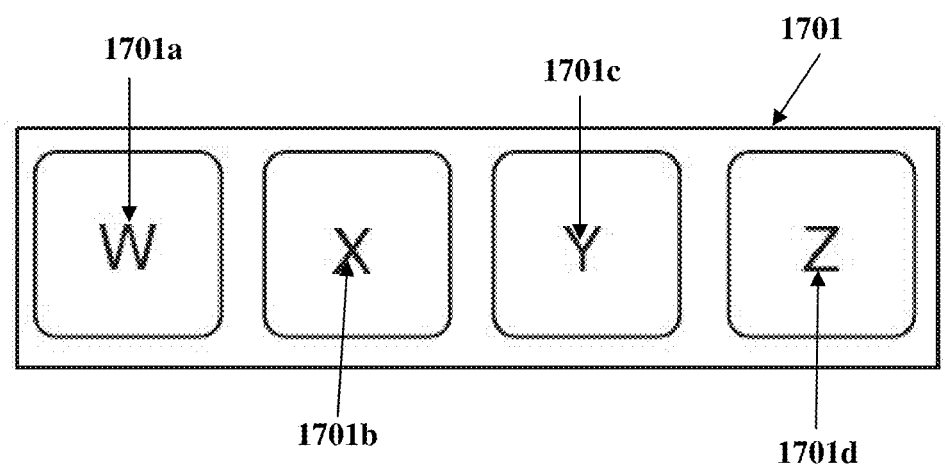
FIG. 17 exemplarily illustrates a color chart for enabling a user to color first opposing sides of the flippable puzzle pieces.
Figure 20:
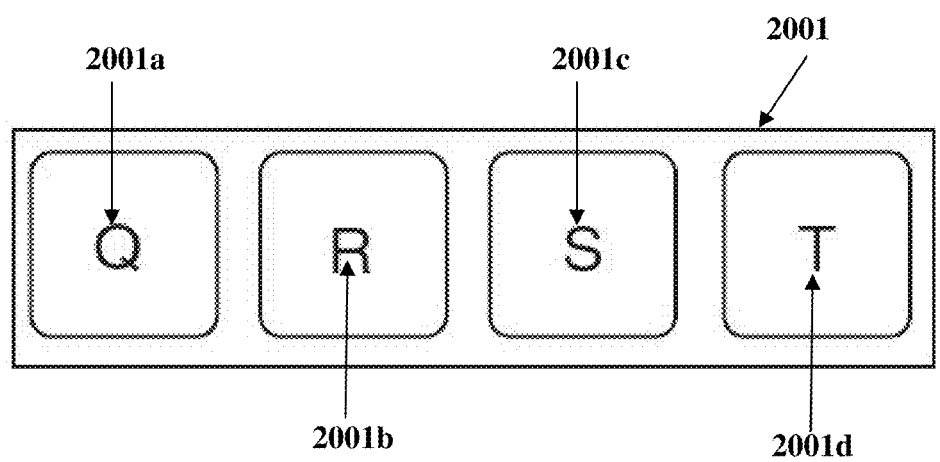
FIG. 20 exemplarily illustrates a color chart for enabling a user to color the second opposing sides of the flipped puzzle pieces.

A user colors the first opposing sides 1501a, 1502a, 1503a, and 1504a and the second opposing sides 1501b, 1502b, 1503b, and 1504b of the puzzle pieces 1501, 1502, 1503, and 1504 based on colors, which correspond to the distinct indicia 1505a, 1505b, 1505c, 1505d and 1505e, 1505f, 1505g, 1505h marked on the first opposing sides 1501a, 1502a, 1503a, and 1504a and the second opposing sides 1501b, 1502b, 1503b, and 1504b respectively of the puzzle pieces 1501, 1502, 1503, and 1504, displayed on two or more color charts 1701 and 2001 exemplarily illustrated in FIG. 17 and FIG. 20 respectively. Separate color charts 1701 and 2001 are provided for enabling the user to color the first opposing sides 1501a, 1502a, 1503a, and 1504a and the second opposing sides 150b, 1502b, 1503b, and 1504b respectively, of the puzzle pieces 1501, 1502, 1503, and 1504 with different colors. The user may then selectively flip the colored puzzle pieces 1501, 1502, 1503, and 1504 for creating the same picture puzzle 1500 with different colors. The puzzle base 905 comprises cavities 905a configured to conform to the flippable puzzle pieces 1501, 1502, 1503, and 1504 for accommodating each of the puzzle pieces 1501, 1502, 1503, and 1504. As exemplarily illustrated in FIG. 15, the puzzle base 905 comprises cavities 905a configured to define a picture puzzle 1500 of a set of balloons.

Figure 16:
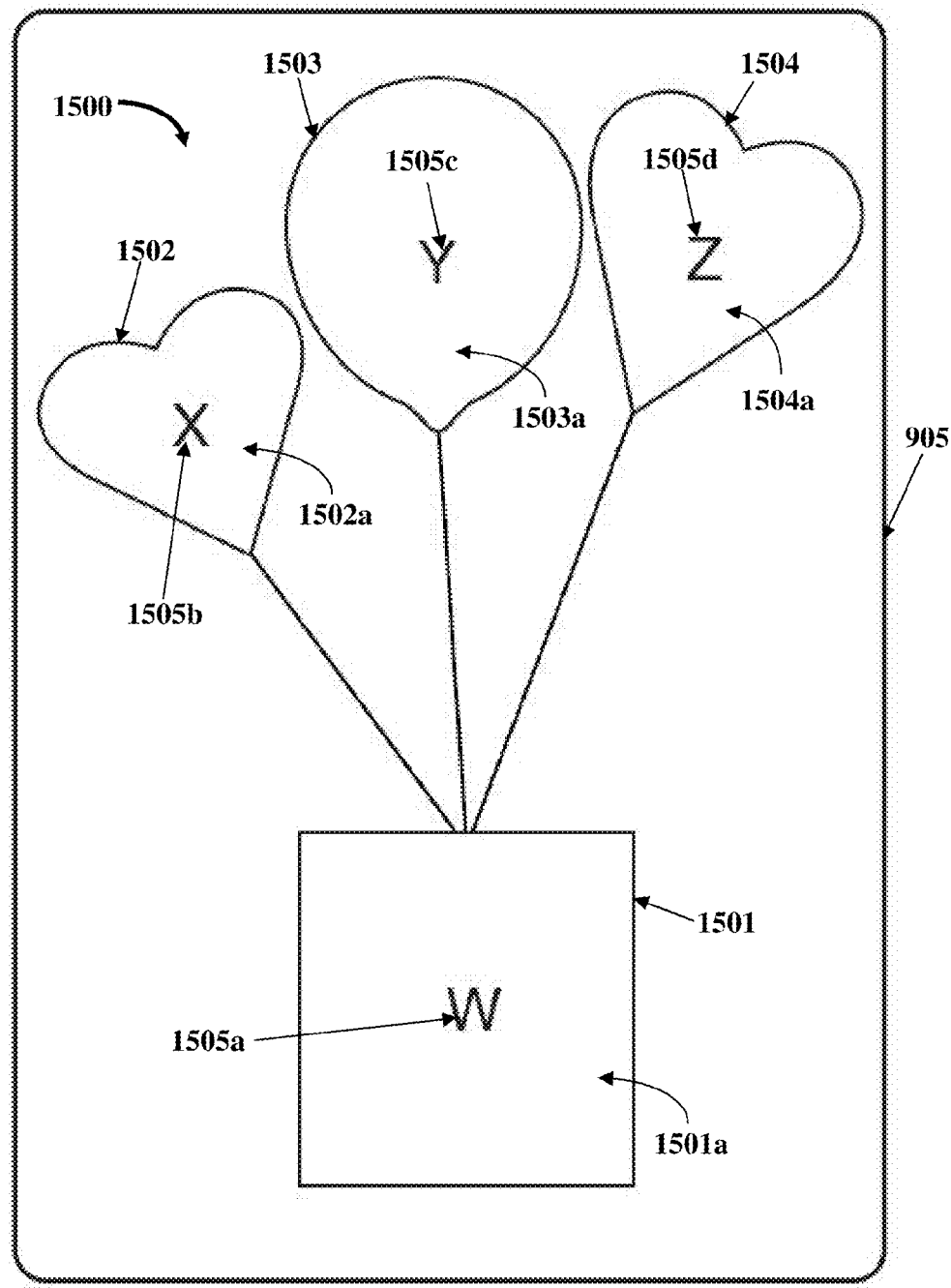
FIG. 16 exemplarily illustrates an orthogonal view of the flippable puzzle pieces assembled to create a picture puzzle colored with one set of colors corresponding to colors displayed on a color chart.

FIG. 16 exemplarily illustrates an orthogonal view of the flippable puzzle pieces 1501, 1502, 1503, and 1504 assembled to create a picture puzzle 1500 colored with one set of colors corresponding to colors displayed on a color chart 1701 exemplarily illustrated in FIG. 17. The first opposing sides 1501a, 1502a, 1503a, and 1504a of the flippable puzzle pieces 1501, 1502, 1503, and 1504 are marked with the indicia W 1505a, X 1505b, Y 1505c, and Z 1505d respectively corresponding to the colors red, yellow, green, and blue respectively. A user colors the first opposing sides 1501a, 1502a, 1503a, and 1504a of the four puzzle pieces 1501, 1502, 1503, and 1504 respectively based on colors displayed on the color chart 1701 exemplarily illustrated in FIG. 17, corresponding to the distinct indicia 1505a, 1505b, 1505c, and 1505d marked on the four puzzle pieces 1501, 1502, 1503, and 1504 respectively. The user can then assemble the picture puzzle 1500 of, for example, a set of balloons by fixing the colored puzzle pieces 1501, 1502, 1503, and 1504 in the cavities 905a defined in the puzzle base 905 as exemplarily illustrated in FIGS. 15-16. The flippable puzzle pieces 1501, 1502, 1503, and 1504 are configured to fit in the cavities 905a defined in the puzzle base 905 on either of their respective opposing sides 1501a-1501b, 1502a-1502b, 1503a-1503b, and 1504a-1504b.

FIG. 17 exemplarily illustrates a color chart 1701 for enabling a user to color the first opposing sides 1501a, 1502a, 1503a, and 1504a of the flippable puzzle pieces 1501, 1502, 1503, and 1504 respectively exemplarily illustrated in FIG. 16. The color chart 1701 displays multiple colors corresponding to the distinct indicia 1505a, 1505b, 1505c, and 1505d marked on the first opposing sides 1501a, 1502a, 1503a, and 1504a of the puzzle pieces 1501, 1502, 1503, and 1504 respectively exemplarily illustrated in FIGS. 15-16. The color chart 1701 displays the colors with corresponding indicia 1701a, 1701b, 1701c, and 1701d by superimposing the corresponding indicia 1701a, 1701b, 1701c, and 1701d against a background of colors. For example, indicia W 1701a is superimposed against a red background in the color chart 1701. The color chart 1701 for the picture puzzle 1500 illustrated in FIG. 16 displays indicia 1701a, 1701b, 1701c, and 1701d, for example, W 1701a, X 1701b, Y 1701c, and Z 1701d against background colors red, yellow, green, and blue respectively. The user can then infer that the indicia W 1701a corresponds to the color red and may then color an opposing side 1501a of the puzzle piece 1501 marked with the indicia W 1505a with a red color using the coloring tools 105 provided in the picture puzzle kit 100 exemplarily illustrated in FIG. 1.

Similarly, the user can infer that the indicia X 1701b, Y 1701c, and Z 1701d correspond to the colors yellow, green, and blue respectively and may then color the first opposing sides 1502a, 1503a, and 1504a of the puzzle pieces 1502, 1503, and 1504 marked with the indicia X 1505b, Y 1505c, and Z 1505d respectively, exemplarily illustrated in FIG. 16, with the colors yellow, green, and blue respectively using the coloring tools 105 provided in the picture puzzle kit 100. The coloring tools 105, exemplarily illustrated in FIG. 1, enable the user to color the first opposing sides 1501a, 1502a, 1503a, and 1504a of the puzzle pieces 1501, 1502, 1503, and 1504 respectively with colors corresponding to the colors displayed on the color chart 1701, which correspond to the distinct indicia 1505a, 1505b, 1505c, and 1505d marked on the puzzle pieces 1501, 1502, 1503, and 1504 respectively.

Figure 18:
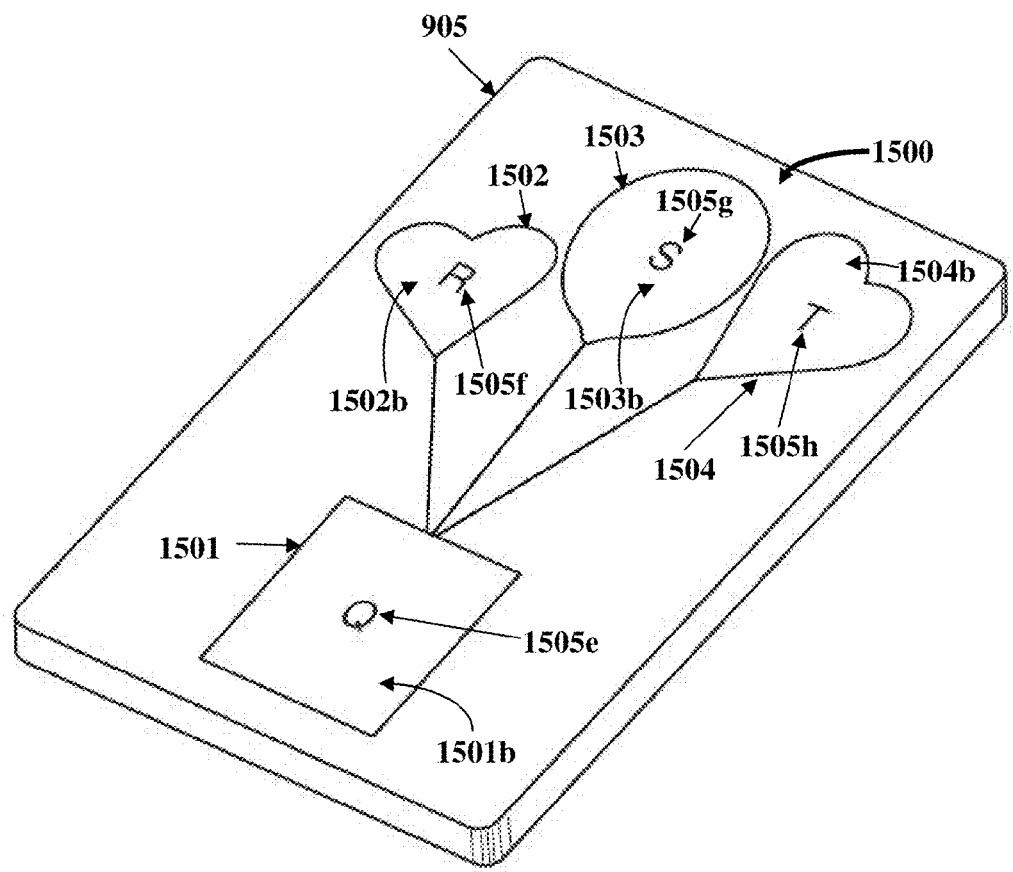
FIG. 18 exemplarily illustrates a perspective view of the puzzle pieces of FIG. 15 flipped to reveal indicia marked on second opposing sides of the puzzle pieces and assembled to create the picture puzzle.

FIG. 18 exemplarily illustrates a perspective view of the puzzle pieces 1501, 1502, 1503, and 1504 of FIG. 15 flipped to reveal indicia 1505e, 1505f, 1505g, and 1505h marked on the second opposing sides 1501b, 1502b, 1503b, and 1504b of the puzzle pieces 1501, 1502, 1503, and 1504 respectively and assembled to create the picture puzzle 1500. The user can flip each of the puzzle pieces 1501, 1502, 1503, and 1504 to reveal indicia 1505e, 1505f, 1505g, and 1505h marked on the second opposing sides 1501b, 1502b, 1503b, and 1504b of the puzzle pieces 1501, 1502, 1503, and 1504 respectively. The second opposing sides 1501b, 1502b, 1503b, and 1504b of the flippable puzzle pieces 1501, 1502, 1503, and 1504 respectively are marked with the indicia Q 1505e, R 1505f, S 1505g, and T 1505h corresponding to the colors orange, purple, white, and pink respectively. When the puzzle pieces 1501, 1502, 1503, and 1504 are flipped, the user can color the second opposing sides 1501b, 1502b, 1503b, and 1504b of the four puzzle pieces 1501, 1502, 1503, and 1504 respectively based on colors displayed on the color chart 2001 exemplarily illustrated in FIG. 20, corresponding to the distinct indicia 1505e, 1505f, 1505g, and 1505h marked on the four puzzle pieces 1501, 1502, 1503, and 1504 respectively. The user can then assemble the picture puzzle 1500 of, for example, a set of balloons by fixing the flipped and colored puzzle pieces 1501, 1502, 1503, and 1504 in the cavities 905a defined in the puzzle base 905 exemplarily illustrated in FIG. 15.

Figure 19:
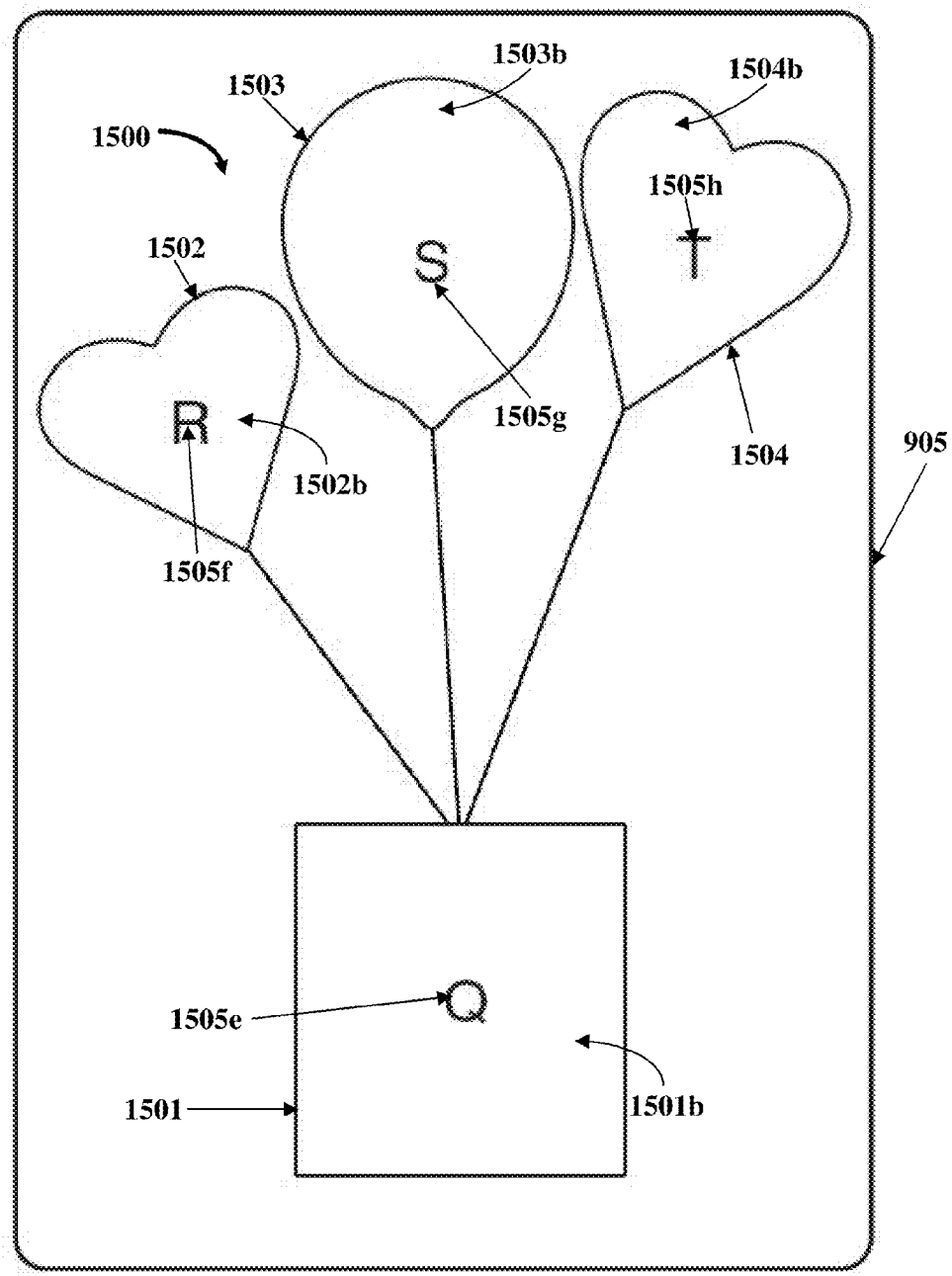
FIG. 19 exemplarily illustrates an orthogonal view of the flipped puzzle pieces assembled to create a picture puzzle colored with another set of colors corresponding to colors displayed on a color chart.

FIG. 19 exemplarily illustrates an orthogonal view of the flipped puzzle pieces 1501, 1502, 1503, and 1504 assembled to create a picture puzzle 1500 colored with another set of colors corresponding to the colors displayed on a color chart 2001. The user flips and colors the puzzle pieces 1501, 1502, 1503, and 1504 marked with the indicia 1505e, 1505f, 1505g, and 1505h n the second opposing sides 1501b, 1502b, 1503b, and 1504b of the puzzle pieces 1501, 1502, 1503, and 1504 respectively for creating the same picture puzzle 1500 with different colors.

FIG. 20 exemplarily illustrates a color chart 2001 for enabling a user to color the second opposing sides 1501b, 1502b, 1503b, and 1504b of the flipped puzzle pieces 1501, 1502, 1503, and 1504 exemplarily illustrated in FIGS. 18-19. The color chart 2001 displays multiple colors corresponding to the distinct indicia 1505e, 1505f, 1505g, and 1505h marked on the second opposing sides 1501b, 1502b, 1503b, and 1504b of the puzzle pieces 1501, 1502, 1503, and 1504 respectively exemplarily illustrated FIGS. 18-19. The color chart 2001 displays the colors with corresponding indicia 2001a, 2001b, 2001c, and 2001d by superimposing the corresponding indicia 2001a, 2001b, 2001c, and 2001d against a background of colors. For example, indicia Q 2001a is superimposed against an orange background in the color chart 2001. The color chart 2001 for the picture puzzle 1500 illustrated in FIGS. 18-19 displays indicia, for example, Q 2001a, R 2001b, S 2001c, and T 2001d against background colors orange, purple, white, and pink respectively. The user can then infer that the indicia Q 2001a corresponds to the color orange and may then color the opposing side 1501b of the puzzle piece 1501 marked with the indicia Q 1505e with an orange color using the coloring tools 105 provided in the picture puzzle kit 100 exemplarily illustrated in FIG. 1.

Similarly, the user can infer that the indicia R 2001b, S 2001c, and T 2001d correspond to the colors purple, white, and pink respectively and may then color the second opposing sides 1502b, 1503b, and 1504b of the puzzle pieces 1502, 1503, and 1504 marked with the indicia R 1505f, S 1505g, and T 1505h respectively, exemplarily illustrated in FIGS. 18-19, with the colors purple, white, and pink respectively using the coloring tools 105 provided in the picture puzzle kit 100. The coloring tools 105, exemplarily illustrated in FIG. 1, enable the user to color the second opposing sides 1501b, 1502b, 1503b, and 1504b of the puzzle pieces 1501, 1502, 1503, and 1504 with colors corresponding to the colors displayed on the color chart 2001, which correspond to the distinct indicia 1505e, 1505f, 1505g, and 1505h marked on the puzzle pieces 1501, 1502, 1503, and 1504 respectively.

In an embodiment, the color charts 907, 909, 1701, and 2001 exemplarily illustrated in FIG. 11, FIG. 13, FIG. 17, and FIG. 20 respectively further comprise a first indicia 501a corresponding to a first color, a non-indicative indicia 501b or 501d marked on a peelable layer 501f on each of the color charts 907, 909, 1701, and 2001, a hidden second indicia 501g or 501h corresponding to a second color positioned below the peelable layer 501f, and a third indicia 501c or 501e corresponding to a resultant third color that will be obtained by mixing the first color and the second color represented by the first indicia 501a and the hidden second indicia 501g or 501h respectively as exemplarily illustrated in FIGS. 5B-5C and disclosed in the detailed description of FIGS. 5B-5C. The user is required to determine the second color represented by the hidden second indicia 501g or 501h, that needs to be mixed with the first color represented by the first indicia 501a on the color charts 907, 909, 1701, and 2001, to obtain the resultant third color represented by the third indicia 501c or 501e on the color charts 907, 909, 1701, and 2001, since there is no color marked on the non-indicative indicia 501b or 501d.

In another embodiment, multiple removable layers (not shown) are stacked one above the other on each of the puzzle pieces 901a, 901b, 901c, 901d, 901e, and 901f exemplarily illustrated in FIG. 10, the puzzle pieces 902a, 902b, 902c, 902d, 902e, and 902f exemplarily illustrated in FIG. 12, and the puzzle pieces 1501, 1502, 1503, and 1504 exemplarily illustrated in FIG. 15. The removable layers are, for example, peel-off self adhesive sheets of flexible plastic or scratch-off layers as disclosed in the detailed description of FIG. 2B. Each of the removable layers is removed to reveal another one of the removable layers below the removed layer. The removable layers are marked with different indicia, therefore each one of the revealed removable layers presents a different coloring possibility on the puzzle pieces 901a, 901b, 901c, 901d, 901e, 901f, 902a, 902b, 902c, 902d, 902e, 902f, 1501, 1502, 1503, and 1504. In an embodiment, each of the removable layers is transparent and is marked with the indicia corresponding to one of the different colors.

In another embodiment, a rub off removable layer (not shown) is provided on each of the puzzle pieces 901a, 901b, 901c, 901d, 901e, 901f, 902a, 902b, 902c, 902d, 902e, 902f, 1501, 1502, 1503, and 1504. The rubbed off removable layer reveals the indicia corresponding to the colors for the puzzle pieces 901a, 901b, 901c, 901d, 901e, 901f, 902a, 902b, 902c, 902d, 902e, 902f, 1501, 1502, 1503, and 1504, when rubbed off.

In another embodiment, each of the puzzle pieces 901a, 901b, 901c, 901d, 901e, 901f, 902a, 902b, 902c, 902d, 902e, 902f, 1501, 1502, 1503, and 1504 comprises an embedded audio assembly 700 as exemplarily illustrated in FIG. 7, for audibly indicating one or more characteristics of the puzzle pieces 901a, 901b, 901c, 901d, 901e, 901f, 902a, 902b, 902c, 902d, 902e, 902f, 1501, 1502, 1503, and 1504 as disclosed in the detailed description of FIG. 2B. In an embodiment, the audio assembly 700 is also embedded in the color charts 907, 909, 1701, and 2001 exemplarily illustrated in FIG. 11, FIG. 13, FIG. 17, and FIG. 20 respectively for audibly indicating colors and corresponding indicia 907a, 907b, 907c, 907d, 907e, 909a, 909b, 909c, 909d, 909e, 1701a, 1701b, 1701c, 1701d, 2001a, 2001b, 2001c, and 2001d displayed on the color charts 907, 909, 1701, and 2001 as disclosed in the detailed description of FIG. 3. In another embodiment, multiple removable translucent layers (not shown) of different colors are stacked one above the other in the color charts 907, 909, 1701, and 2001 as disclosed in the detailed description of FIG. 2B.

In another embodiment, each edge of each of the puzzle pieces 901a, 901b, 901c, 901d, 901e, 901f, 902a, 902b, 902c, 902d, 902e, 902f, 1501, 1502, 1503, and 1504 comprises a sensor 705 as exemplarily illustrated in FIG. 7 for detecting a mismatch when the linking of the puzzle pieces 901a, 901b, 901c, 901d, 901e, 901f, 902a, 902b, 902c, 902d, 902e, 902f, 1501, 1502, 1503, and 1504 is incorrect. On detecting the mismatch, the sensor 705 sends a mismatch signal to the embedded audio assembly 700 in the puzzle pieces 901a, 901b, 901c, 901d, 901e, 901f, 902a, 902b, 902c, 902d, 902e, 902f, 1501, 1502, 1503, and 1504 for generating an audible mismatch message.

Figure 21:
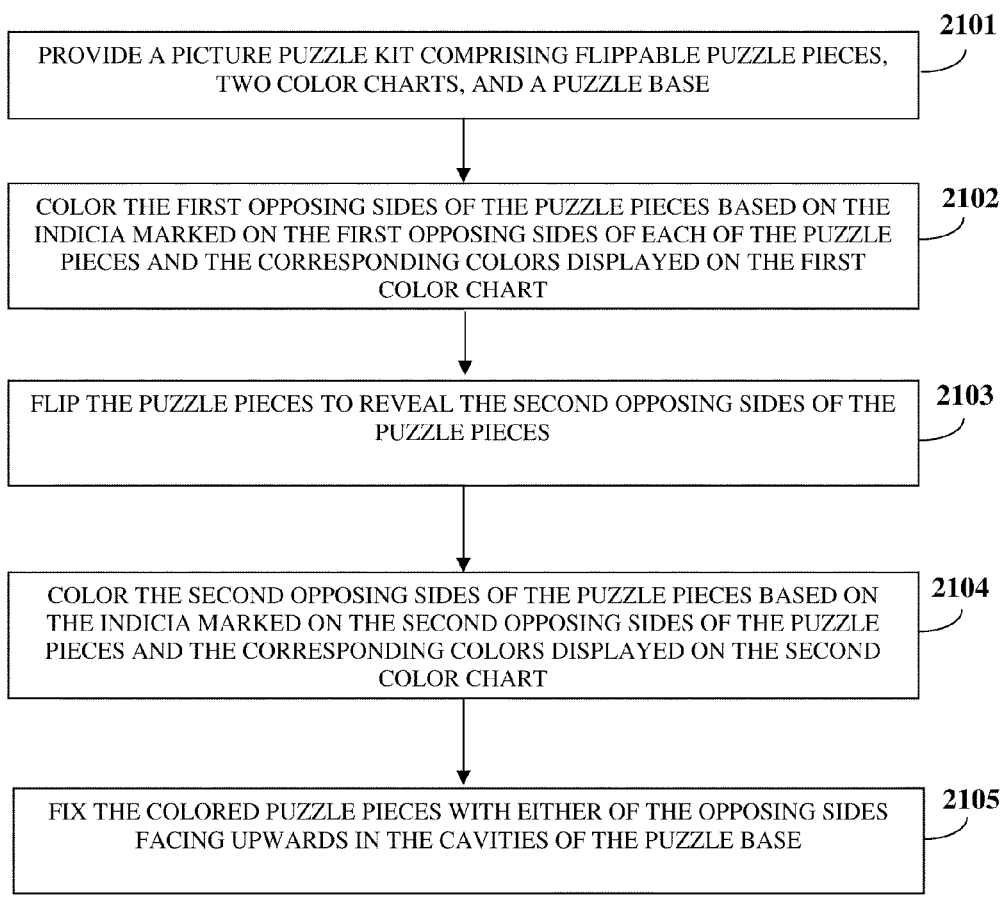
FIG. 21 exemplarily illustrates a method for coloring flippable puzzle pieces of a picture puzzle using indicia marked on opposing sides of the flippable puzzle pieces to create the same picture puzzle with different colors.

FIG. 21 exemplarily illustrates a method for coloring flippable puzzle pieces 1501, 1502, 1503, and 1504 of a picture puzzle 1500 using indicia 1505a, 1505b, 1505c, 1505d and 1505e, 1505f, 1505g, 1505h marked on opposing sides 1501a, 1502a, 1503a, 1504a and 1501b, 1502b, 1503b, 1504b respectively of the flippable puzzle pieces 1501, 1502, 1503, and 1504 to create the same picture puzzle 1500 with different colors as exemplarily illustrated in FIGS. 15-16 and FIGS. 18-19. Consider an example where a picture puzzle kit 100, as exemplarily illustrated in FIG. 1, comprising flippable puzzle pieces 1501, 1502, 1503, and 1504, two color charts 1701 and 2001 exemplarily illustrated in FIG. 17 and FIG. 20 respectively, and a puzzle base 905 exemplarily illustrated in FIG. 15 is provided 2101. The flippable puzzle pieces 1501, 1502, 1503, and 1504 have indicia 1505a, 1505b, 1505c, 1505d and 1505e, 1505f, 1505g, 1505h marked on the first opposing sides 1501a, 1502a, 1503a, and 1504a and the second opposing sides 1501b, 1502b, 1503b, and 1504b respectively of the flippable puzzle pieces 1501, 1502, 1503, and 1504. The color charts 1701 and 2001 display colors corresponding to the distinct indicia 1505a, 1505b, 1505c, 1505d and 1505e, 1505f, 1505g, 1505h marked on the first opposing sides 1501a, 1502a, 1503a, and 1504a and the second opposing sides 1501b, 1502b, 1503b, and 1504b respectively of the puzzle pieces 1501, 1502, 1503, and 1504. The puzzle base 905 comprises cavities 905a configured to define a picture puzzle 1500 as exemplarily illustrated in FIG. 15.

The indicia 1505a, 1505b, 1505c, and 1505d marked on the first opposing sides 1501a, 1502a, 1503a, and 1504a of the puzzle pieces 1501, 1502, 1503, and 1504 respectively are distinct from the indicia 1505e, 1505f, 1505g, and 1505h marked on the second opposing sides 1501b, 1502b, 1503b, and 1504b of the puzzle pieces 1501, 1502, 1503, and 1504 respectively as exemplarily illustrated in FIG. 16 and FIG. 19. A first color chart 1701 displays colors with corresponding indicia 1701a, 1701b, 1701c, and 1701d that match the indicia 1505a, 1505b, 1505c, and 1505d marked on the first opposing sides 1501a, 1502a, 1503a, and 1504a of the puzzle pieces 1501, 1502, 1503, and 1504 respectively. A second color chart 2001 displays colors with corresponding indicia 2001a, 2001b, 2001c, and 2001d that match the indicia 1505e, 1505f, 1505g, and 1505h marked on the second opposing sides 1501b, 1502b, 1503b, and 1504b of the puzzle pieces 1501, 1502, 1503, and 1504 respectively.

The user colors 2102 the first opposing sides 1501a, 1502a, 1503a, and 1504a of the puzzle pieces 1501, 1502, 1503, and 1504 respectively based on the indicia 1505a, 1505b, 1505c, and 1505d marked on the first opposing sides 1501a, 1502a, 1503a, and 1504a of the puzzle pieces 1501, 1502, 1503, and 1504 respectively and the corresponding colors marked on the first color chart 1701. The user then flips 2103 the puzzle pieces 1501, 1502, 1503, and 1504 to reveal the second opposing sides 1501b, 1502b, 1503b, and 1504b of the puzzle pieces 1501, 1502, 1503, and 1504 respectively. The user then colors 2104 the second opposing sides 1501b, 1502b, 1503b, and 1504b of the puzzle pieces 1501, 1502, 1503, and 1504 respectively based on the indicia 1505e, 1505f, 1505g, and 1505h marked on the second opposing sides 1501b, 1502b, 1503b, and 1504b of the puzzle pieces 1501, 1502, 1503, and 1504 respectively and the corresponding colors marked on the second color chart 2001. The user then fixes 2105 the colored puzzle pieces 1501, 1502, 1503, and 1504 with either of the opposing sides 1501a, 1502a, 1503a, 1504a and 1501b, 1502b, 1503b, 1504b facing upwards in the cavities 905a of the puzzle base 905 exemplarily illustrated in FIG. 15. The user can thereby create the same picture puzzle 1500 with different color schemes.

The picture puzzle kit 100 disclosed herein helps to teach children and other users colors, alphabets, numbers, symbols, and shape recognition while creating a piece of puzzle art that can be played with over and over again.

The foregoing examples have been provided merely for the purpose of explanation and are in no way to be construed as limiting of the invention disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

I claim:

1. A picture puzzle kit for coloring duplicate picture puzzles marked with distinct indicia corresponding to a plurality of colors, comprising:
   two or more sets of puzzle pieces, said puzzle pieces comprising parts that define a picture puzzle;
   said puzzle pieces in one of said two or more sets of puzzle pieces being duplicates of corresponding said puzzle pieces in another one of said two or more sets of puzzle pieces, wherein said puzzle pieces in each of said two or more sets of puzzle pieces are linked for assembling said duplicate picture puzzles;
   indicia marked on each of said puzzle pieces in said two or more sets of puzzle pieces, said indicia corresponding to a color, wherein said indicia marked on said puzzle pieces in one of said two or more sets of puzzle pieces are distinct from said indicia marked on said puzzle pieces in another one of said two or more sets of puzzle pieces;
   two or more color charts for displaying a plurality of colors corresponding to said distinct indicia marked on said puzzle pieces; and
   a plurality of coloring tools for coloring said puzzle pieces in said two or more sets of puzzle pieces based on said colors displayed on said two or more color charts corresponding to said distinct indicia marked on said puzzle pieces;
   whereby said picture puzzle kit enables a user to color said duplicate picture puzzles with different colors, based on said distinct indicia marked on said puzzle pieces and corresponding to said different colors.

2. The picture puzzle kit of claim 1, further comprising a puzzle base having one or more cavities configured to conform to said duplicate picture puzzles for accommodating each of said puzzle pieces in said each of said two or more sets of puzzle pieces.

3. The picture puzzle kit of claim 2, wherein said puzzle pieces in said one of said two or more sets of puzzle pieces are placed above corresponding said puzzle pieces in said another one of said two or more sets of puzzle pieces in said one or more cavities of said puzzle base.

4. The picture puzzle kit of claim 1, wherein said corresponding said puzzle pieces of said two or more sets of puzzle pieces are interchangeable for creating said duplicate picture puzzles of said different colors.

5. The picture puzzle kit of claim 1, wherein said indicia are marked on opposing sides of said puzzle pieces, wherein said indicia marked on one of said opposing sides of each of said puzzle pieces is distinct from said indicia marked on another one of said opposing sides of said each of said puzzle pieces.

6. The picture puzzle kit of claim 5, wherein said puzzle pieces marked with said indicia on said opposing sides of said puzzle pieces are flippable for creating said picture puzzle of said different colors.

7. The picture puzzle kit of claim 1, wherein said linking of said puzzle pieces is performed by placing said puzzle pieces adjacent to one another.

8. The picture puzzle kit of claim 1, wherein said puzzle pieces are shaped as jigsaw puzzle pieces for interlocking adjacent said puzzle pieces.

9. The picture puzzle kit of claim 1, wherein each of said two or more color charts displays said colors with corresponding indicia by superimposing said corresponding indicia against a background of said colors.

10. The picture puzzle kit of claim 1, wherein said coloring tools enable said user to color said puzzle pieces with colors corresponding to said colors displayed on said two or more color charts.

11. The picture puzzle kit of claim 1, wherein said coloring tools comprise one or more of paints, crayons, inks, markers, dyes, and pigments.

12. The picture puzzle kit of claim 1, wherein one or more of said two or more color charts comprises:
   a first indicia corresponding to a first color;
   a non-indicative indicia marked on a peelable layer on said one or more of said two or more color charts;

said peelable layer adjacent to and in removable contact with a hidden second indicia;

said hidden second indicia corresponding to a second color, wherein said hidden second indicia is positioned below said peelable layer, wherein said hidden second indicia corresponding to said second color is revealed on removing said peelable layer marked with said non-indicative indicia; and a third indicia corresponding to a resultant third color that will be obtained by mixing said first color and said second color represented by said first indicia and said hidden second indicia respectively.

13. The picture puzzle kit of claim 1, further comprising a plurality of removable layers stacked one above the other on each of said puzzle pieces, wherein one of said removable layers is removed for revealing another one of said removable layers below said removed one of said removable layers, wherein each of said removable layers is transparent and is marked with said indicia corresponding to one of said colors.

14. The picture puzzle kit of claim 13, wherein said coloring tools provide translucent colors for coloring said transparent removable layers, wherein said colored transparent removable layers, when combined, form new colors.

15. The picture puzzle kit of claim 14, further comprising a light source embedded in each of said puzzle pieces to illuminate said colored transparent removable layers stacked on said each of said puzzle pieces.

16. The picture puzzle kit of claim 1, further comprising a rub off removable layer provided on each of said puzzle pieces, wherein said rub off removable layer reveals said indicia corresponding to one of said colors when rubbed off.

17. The picture puzzle kit of claim 1, wherein each of said puzzle pieces comprises an embedded audio assembly for audibly indicating colors for coloring said each of said puzzle pieces.

18. The picture puzzle kit of claim 17, wherein said embedded audio assembly audibly indicates a resultant color obtainable by combining two or more colors when said puzzle pieces marked with said indicia corresponding to said two or more colors are pressed sequentially or simultaneously.

19. The picture puzzle kit of claim 17, wherein said embedded audio assembly audibly indicates one or more of a plurality of characteristics of said each of said puzzle pieces when said each of said puzzle pieces is pressed one or more times.

20. The picture puzzle kit of claim 17, wherein each edge of said each of said puzzle pieces comprises a sensor for detecting a mismatch when said linking of said puzzle pieces is incorrect, whereby a mismatch signal is sent to said embedded audio assembly for audibly indicating said mismatch.

21. The picture puzzle kit of claim 1, further comprising a plurality of removable translucent layers of a plurality of colors stacked one above the other in one or more of said two or more color charts, wherein when said removable translucent layers are placed above each other on one of said puzzle pieces, a resultant color obtainable by combining said plurality of colors appears on said one of said puzzle pieces on receiving illumination from a light source embedded in said one of said puzzle pieces.

22. The picture puzzle kit of claim 1, wherein one or more of said two or more color charts comprises an embedded audio assembly for audibly indicating said colors and corresponding indicia displayed on said one or more of said two or more color charts.

23. A picture puzzle kit comprising:
two or more sets of puzzle pieces, said puzzle pieces comprising parts that define a picture puzzle, each of said puzzle pieces having a length, a width, and a thickness, said thickness being small compared to said length and said width, said each of said puzzle pieces defining an outside edge, said outside edge of said each of said puzzle pieces being configured to mate with outside edges of at least one other of said puzzle pieces;

said puzzle pieces in one of said two or more sets of puzzle pieces being duplicates of corresponding said puzzle pieces in another one of said two or more sets of puzzle pieces, wherein said puzzle pieces in each of said two or more sets of puzzle pieces are linked for assembling duplicate picture puzzles;

indicia marked on each of said puzzle pieces in said two or more sets of puzzle pieces, said indicia corresponding to a color, wherein said indicia marked on said puzzle pieces in one of said two or more sets of puzzle pieces are distinct from said indicia marked on said puzzle pieces in another one of said two or more sets of puzzle pieces;

two or more color charts comprising said distinct indicia, said two or more color charts displaying a plurality of colors corresponding to said distinct indicia;

a plurality of coloring tools, said coloring tools corresponding to said colors; and said puzzle pieces in said two or more sets of puzzle pieces together defining said duplicate picture puzzles when said outside edge of said each of said puzzle pieces in each of said two or more sets of puzzle pieces are mated one to another and said puzzle pieces are colored using said coloring tools corresponding to said colors associated by said two or more color charts with said indicia marked on said puzzle pieces.

24. The picture puzzle kit of claim 23, further comprising a plurality of removable layers stacked one above the other on each of said puzzle pieces, wherein one of said removable layers is removed for revealing another one of said removable layers below said removed one of said removed layers, wherein each of said removable layers is transparent and is marked with said indicia corresponding to one of said colors.

25. The picture puzzle kit of claim 23, wherein one or more of said two or more color charts comprises an embedded audio assembly for audibly indicating said colors and corresponding indicia displayed on said one or more of said two or more color charts, wherein said embedded audio assembly audibly indicates said colors and a resultant color obtained by mixing said colors when pressed.

26. The picture puzzle kit of claim 23, wherein each of said puzzle pieces comprises an embedded audio assembly for audibly indicating a plurality of characteristics of said each of said puzzle pieces when said each of said puzzle pieces is pressed one or more times, wherein said embedded audio assembly audibly indicates a plurality of colors and a resultant color obtained by mixing said colors when pressed.

27. A method for coloring and assembling duplicate picture puzzles marked with distinct indicia corresponding to a plurality of colors, comprising:
providing a picture puzzle kit, comprising:
two or more sets of puzzle pieces, said puzzle pieces comprising parts that define a picture puzzle;
said puzzle pieces in one of said two or more sets of puzzle pieces being duplicates of corresponding said puzzle pieces in another one of said two or more sets of puzzle pieces, wherein said puzzle pieces in each of said two or more sets of puzzle pieces are linked for assembling said duplicate picture puzzles;
indicia marked on each of said puzzle pieces in said two or more sets of puzzle pieces, said indicia corresponding to a color, wherein said indicia marked on said puzzle pieces in one of said two or more sets of puzzle pieces are distinct from said indicia marked on said puzzle pieces in another one of said two or more sets of puzzle pieces;

two or more color charts for displaying a plurality of colors corresponding to said distinct indicia marked on said puzzle pieces; and a plurality of coloring tools for coloring said puzzle pieces in said two or more sets of puzzle pieces based on said colors displayed on said two or more color charts corresponding to said distinct indicia marked on said puzzle pieces;

coloring said puzzle pieces marked with said indicia in one of said two or more sets of puzzle pieces with colors corresponding to said colors displayed on one of said two or more color charts using said coloring tools, by associating said indicia marked on said puzzle pieces with corresponding indicia and said colors displayed on said one of said two or more color charts;

coloring said puzzle pieces marked with said indicia in another one of said two or more sets of puzzle pieces with colors corresponding to said colors displayed on another one of said two or more color charts using said coloring tools, by associating said indicia marked on said puzzle pieces with corresponding indicia and said colors displayed on said another one of said two or more color charts; and linking said colored puzzle pieces in each of said two or more sets of puzzle pieces for assembling said duplicate picture puzzles.

28. The method of claim 27, further comprising interchanging corresponding said colored puzzle pieces in said two or more sets of puzzle pieces for creating said duplicate picture puzzles of different colors.

29. The method of claim 27, wherein said indicia are marked on opposing sides of said puzzle pieces, wherein said indicia marked on one of said opposing sides of each of said puzzle pieces is distinct from said indicia marked on another one of said opposing sides of said each of said puzzle pieces, and wherein a user colors each of said opposing sides of said puzzle pieces based on said colors corresponding to said distinct indicia, displayed on said two or more color charts.

30. A method for coloring puzzle pieces of duplicate picture puzzles with a plurality of colors using distinct indicia marked on said puzzle pieces, comprising:

providing a picture puzzle kit, comprising:
two or more sets of puzzle pieces, said puzzle pieces comprising parts that define a picture puzzle;
said puzzle pieces in one of said two or more sets of puzzle pieces being duplicates of corresponding said puzzle pieces in another one of said two or more sets of puzzle pieces, wherein said puzzle pieces in each of said two or more sets of puzzle pieces are linked for assembling said duplicate picture puzzles;

indicia marked on each of said puzzle pieces in said two or more sets of puzzle pieces, said indicia corresponding to a color, wherein said indicia marked on said puzzle pieces in one of said two or more sets of puzzle pieces are distinct from said indicia marked on said puzzle pieces in another one of said two or more sets of puzzle pieces;

two or more color charts for displaying a plurality of colors corresponding to said distinct indicia marked on said puzzle pieces, wherein one or more of said two or more color charts comprises:
a first indicia corresponding to a first color;
a non-indicative indicia marked on a peelable layer on said one or more of said two or more color charts;
said peelable layer adjacent to and in removable contact with a hidden second indicia;
said hidden second indicia corresponding to a second color, wherein said hidden second indicia is positioned below said peelable layer, wherein said hidden second indicia corresponding to said second color is revealed on removing said peelable layer marked with said non-indicative indicia; and
a third indicia corresponding to a resultant third color that will be obtained by mixing said first color and said second color represented by said first indicia and said hidden second indicia respectively; and a plurality of coloring tools for coloring said puzzle pieces in said two or more sets of puzzle pieces based on said colors displayed on said two or more color charts corresponding to said distinct indicia marked on said puzzle pieces;

determining said second color represented by said hidden second indicia on said one or more of said two or more color charts that needs to be mixed with said first color represented by said first indicia on said one or more of said two or more color charts to obtain said resultant third color represented by said third indicia on said one or more of said two or more color charts, by mixing a plurality of colors with said first color using said coloring tools from said picture puzzle kit;

removing said peelable layer marked with said non-indicative indicia to reveal said hidden second indicia corresponding to said second color to be mixed with said first color for obtaining said resultant third color, on failure to determine said second color;

mixing said first color with said second color using said coloring tools of said picture puzzle kit to produce said resultant third color; and coloring one or more of said puzzle pieces marked with said indicia corresponding to said third indicia using said produced third color.

\* \* \* \* \*